US012726151B2

(12) United States Patent
Wambaugh et al.

(10) Patent No.: US 12,726,151 B2
(45) **Date of Patent: *Sep. 1, 2026**

(54) ULTRA STABLE CEMENTITIOUS MATERIAL FORMULATION, PROCESS FOR ITS MAKING, AND ULTRA STABLE TILE BACKER BOARD FORMULATION AND PROCESSES FOR ITS MAKING

(71) Applicant: TRITON MGO PRODUCTS, LLC, Houston, TX (US)

(72) Inventors: James A. Wambaugh, Chesterfield, MO (US); Brett Rochner, Chesterfield, MO (US)

(73) Assignee: Triton MgO Products, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/456,287

(22) Filed: Aug. 25, 2023

(65) Prior Publication Data

US 2024/0243689 A1 Jul. 18, 2024

Related U.S. Application Data

(63) Continuation of application No. 16/235,444, filed on Dec. 28, 2018, now Pat. No. 11,777,440, which is a (Continued)

(51) Int. Cl.
*C04B 28/32* (2006.01)
*B60L 8/00* (2006.01)
(Continued)

(52) U.S. Cl.
CPC .............. *H02S 10/20* (2014.12); *B60L 8/003* (2013.01); *C04B 14/18* (2013.01); *C04B 14/28* (2013.01);
(Continued)

(58) Field of Classification Search
CPC ........... C04B 28/32; C04B 28/34; C04B 9/02; C04B 9/04
See application file for complete search history.

(56) References Cited

U.S. PATENT DOCUMENTS 1,019,083 A 3/1912 Pink
1,811,799 A 6/1931 Lukens
(Continued)

FOREIGN PATENT DOCUMENTS

CN 1049838 A 3/1991
CN 1092051 A 9/1994
(Continued)

OTHER PUBLICATIONS

Aiken et al., Magnesium oxychloride boards: understanding a novel building material, Materials and Structures (2020) 53:118 https://doi.org/10.1617/s11527-020-01547-z (Year: 2020).*
(Continued)

*Primary Examiner* — Hoa (Holly) Le
(74) *Attorney, Agent, or Firm* — Stinson LLP

(57) ABSTRACT

An ultrastable cementitious material with nano-molecular veneer makes a cementitious material by blending 29 wt % to 40 wt % of a magnesium oxide dry powder containing 80 wt % to 98 wt % of magnesium oxide based on a final total weight of the cementitious material, with 14 wt % to 18 wt % of a magnesium chloride dissolved in water and reacting to form a liquid suspension, mixing from 2 to 10 minutes, adding a phosphorus-containing material, and allowing the liquid suspension to react into an amorphous phase cementitious material, wherein a portion of the amorphous phase cementitious material grows a plurality of crystals. The plurality of crystals are encapsulated by the amorphous phase cementitious material forming a nano-molecular veneer. A process to make the ultrastable cementitious material. A tile backer board incorporating the ultrastable
(Continued)

cementitious material and a process for making the tile backer board.

20 Claims, 26 Drawing Sheets

Related U.S. Application Data continuation of application No. 16/006,554, filed on Jun. 12, 2018, now Pat. No. 10,167,230, and a continuation of application No. 16/006,598, filed on Jun. 12, 2018, now Pat. No. 10,167,232, and a continuation of application No. 16/006,583, filed on Jun. 12, 2018, now Pat. No. 10,227,259, and a continuation of application No. 16/006,570, filed on Jun. 12, 2018, now Pat. No. 10,167,231.

(60) Provisional application No. 62/582,517, filed on Nov. 7, 2017, provisional application No. 62/582,545, filed on Nov. 7, 2017.

(51) Int. Cl.

| | |
|---|---|
| ***C04B 14/18*** | (2006.01) |
| ***C04B 14/28*** | (2006.01) |
| ***C04B 14/38*** | (2006.01) |
| ***C04B 14/42*** | (2006.01) |
| ***C04B 16/06*** | (2006.01) |
| ***C04B 16/08*** | (2006.01) |
| ***C04B 18/24*** | (2006.01) |
| ***C04B 22/16*** | (2006.01) |
| ***E04C 2/04*** | (2006.01) |
| ***E04C 2/26*** | (2006.01) |
| ***H02S 10/10*** | (2014.01) |
| ***H02S 10/20*** | (2014.01) |
| ***H02S 40/32*** | (2014.01) |
| ***H02S 40/38*** | (2014.01) |
| *C04B 9/02* | (2006.01) |
| *C04B 9/04* | (2006.01) |
| *C04B 9/20* | (2006.01) |
| *C04B 103/65* | (2006.01) |
| *C04B 111/00* | (2006.01) |
| *E04B 2/56* | (2006.01) |
| *E04B 2/64* | (2006.01) |
| *E04B 2/66* | (2006.01) |
| *E04B 2/68* | (2006.01) |
| *E04B 2/72* | (2006.01) |
| *E04C 2/06* | (2006.01) |
| *E04C 2/16* | (2006.01) |
| *E04C 2/288* | (2006.01) |

(52) U.S. Cl.

CPC ............ *C04B 14/386* (2013.01); *C04B 14/42* (2013.01); *C04B 16/0608* (2013.01); *C04B 16/08* (2013.01); *C04B 18/248* (2013.01); *C04B 22/165* (2013.01); *C04B 28/32* (2013.01); *E04C 2/044* (2013.01); *E04C 2/26* (2013.01); *H02S 10/10* (2014.12); *H02S 40/32* (2014.12); *H02S 40/38* (2014.12); *B60L 2200/10* (2013.01); *B60L 2200/32* (2013.01); *C04B 9/02* (2013.01); *C04B 9/04* (2013.01); *C04B 9/20* (2013.01); *C04B 14/38* (2013.01); *C04B 16/06* (2013.01); *C04B 2103/65* (2013.01); *C04B 2111/00482* (2013.01); *C04B 2111/00629* (2013.01); *E04B 2/56* (2013.01); *E04B 2/64* (2013.01); *E04B 2/66* (2013.01); *E04B 2/68* (2013.01); *E04B 2/72* (2013.01); *E04B 2103/02* (2013.01); *E04C 2/049* (2013.01); *E04C 2/06* (2013.01); *E04C 2/16* (2013.01); *E04C 2/288* (2013.01)

(56) References Cited

U.S. PATENT DOCUMENTS

| | | | | |
|---|---|---|---|---|
| 1,853,522 | A | 4/1932 | Stewart | |
| 2,351,641 | A | 6/1944 | Sohl et al. | |
| 2,543,959 | A | 3/1951 | Eastin | |
| 2,692,219 | A | 10/1954 | Slayter et al. | |
| 2,702,753 | A | 2/1955 | Dickey | |
| 3,320,077 | A | 5/1967 | Prior | |
| 4,141,744 | A | 2/1979 | Prior et al. | |
| 4,158,570 | A | 6/1979 | Irwin | |
| 4,352,694 | A * | 10/1982 | Smith-Johannsen | C04B 28/32 106/685 |
| 4,613,627 | A | 9/1986 | Sherman et al. | |
| 4,983,457 | A | 1/1991 | Hino et al. | |
| 5,130,184 | A | 7/1992 | Ellis | |
| 5,434,200 | A | 7/1995 | Kolker et al. | |
| 5,603,168 | A | 2/1997 | McMahon, Jr. | |
| 6,200,381 | B1 | 3/2001 | Rechichi | |
| 6,319,579 | B1 | 11/2001 | Strandgaard | |
| 7,255,907 | B2 | 8/2007 | Feigin et al. | |
| 7,595,092 | B2 | 9/2009 | Huddy et al. | |
| 7,867,597 | B2 | 1/2011 | Feigin et al. | |
| 7,921,800 | B2 | 4/2011 | Huddy et al. | |
| 7,998,547 | B2 | 8/2011 | Feigin et al. | |
| 8,066,812 | B2 | 11/2011 | Wu et al. | |
| 8,181,580 | B2 | 5/2012 | Roth et al. | |
| 8,603,237 | B2 | 12/2013 | Rademan et al. | |
| 8,959,861 | B1 | 2/2015 | Wambaugh et al. | |
| 10,167,230 | B1 | 1/2019 | Wambaugh | |
| 10,167,231 | B1 | 1/2019 | Wambaugh et al. | |
| 10,167,232 | B1 | 1/2019 | Wambaugh | |
| 10,227,259 | B1 * | 3/2019 | Wambaugh | C04B 16/08 |
| 10,696,595 | B2 | 6/2020 | Wambaugh | |
| 10,897,222 | B2 | 1/2021 | Wambaugh | |
| 10,910,988 | B2 | 2/2021 | Wambaugh et al. | |
| 11,577,999 | B2 | 2/2023 | Wambaugh et al. | |
| 11,777,440 | B2 * | 10/2023 | Wambaugh | H02S 40/32 428/323 |
| 2004/0126602 | A1 | 7/2004 | Wallner | |
| 2006/0070321 | A1 | 4/2006 | Au | |
| 2008/0275149 | A1 | 11/2008 | Ladely et al. | |
| 2009/0065972 | A1 | 3/2009 | Feigin et al. | |
| 2011/0088597 | A1 | 4/2011 | Wu et al. | |
| 2011/0108241 | A1 | 5/2011 | Driscoll et al. | |
| 2012/0171429 | A1 * | 7/2012 | Man | C04B 28/348 524/145 |
| 2013/0256578 | A1 | 10/2013 | Li et al. | |
| 2013/0263759 | A1 | 10/2013 | Rademan | |
| 2016/0304396 | A1 | 10/2016 | Shand et al. | |
| 2017/0283324 | A1 | 10/2017 | Cui | |
| 2018/0036911 | A1 | 2/2018 | Dubey et al. | |
| 2018/0036912 | A1 | 2/2018 | Dubey et al. | |
| 2019/0341875 | A1 | 11/2019 | Wambaugh et al. | |
| 2019/0379319 | A1 | 12/2019 | Wambaugh | |
| 2020/0181023 | A1 | 6/2020 | Wambaugh et al. | |
| 2024/0025809 | A1 * | 1/2024 | Wambaugh | E04C 2/044 |

FOREIGN PATENT DOCUMENTS

| | | | |
|---|---|---|---|
| CN | 2189528 | Y | 2/1995 |
| CN | 1262171 | A | 8/2000 |
| CN | 1415574 | A | 5/2003 |
| CN | 1450017 | A | 10/2003 |
| CN | 1456528 | A | 11/2003 |
| CN | 101857414 | A | 10/2010 |
| CN | 102464482 | A | 5/2012 |
| CN | 102838341 | A | 12/2012 |
| CN | 103553410 | A | 2/2014 |
| CN | 105036578 | A | 11/2015 |
| CN | 105272134 | A | 1/2016 |
| CN | 104609752 | A | 4/2017 |
| CN | 107673727 | A | 2/2018 |

(56) References Cited

FOREIGN PATENT DOCUMENTS

| | | | |
|---|---|---|---|
| GB | 638926 | A | 6/1950 |
| JP | 2019094243 | A | 6/2019 |
| WO | 9011976 | A1 | 10/1990 |
| WO | 03043947 | A2 | 5/2003 |
| WO | 2013151819 | A1 | 10/2013 |
| WO | 2020093111 | A1 | 5/2020 |

OTHER PUBLICATIONS

International Preliminary Report on Patentability, PCT/US2018/067796, dated Dec. 15, 2020, 14 pages.
Extended European Search Report from EP Application No. 18922905.7, mailed Feb. 8, 2022, 16 pages.
Gochez et al., "Phosphoric acid-modified magnesium oxychloride: Study of water stability, kinetics, and pair distribution function," J Am. Ceram. Soc. 2019; 102:3728-3737 (Year: 2019).
International Search Report, PCT/US2018/067796, dated Mar. 27, 2019, 2 pages.
Deng, Dehua, "The mechanism for soluble phosphates to improve the water resistance of magnesium oxychloride cement," Cement and Concrete Research, vol. 33, 2003, pp. 1311-1317.
Deng, Dehua, "The formation mechanism of the hydrate phases in magnesium oxychloride cement," Cement and Concrete Research, vol. 29, 1999, pp. 1365-1371.
Feng et al., "Research on improving the water resistance of magnesium oxychloride cement," Gongneng Cailiao/Journal of Functional Materials, vol. 46, Issue 17, 2015, pp. 17038-17041 and 17045.
Walling et al., "Magnesia-Based Cements: A Journey of 150 Years, and Cements for the Future?," Chem. Rev. vol. 116, 2016, pp. 4170-4204.
Tan et al., "Effect of phosphoric acid on the properties of magnesium oxychloride cement as a biomaterial," Cement and Concrete Research, vol. 56, 2014, pp. 69-74.
Li et al., "The influence of compound additive on magnesium oxychloride cement/urban refuse floor tile," Construction and Building Materials, vol. 22, Issue 4, Apr. 2008, pp. 521-525.
Gochez et al., "(174h) Microstructure Characterization of Magnesium Oxide-Based Wallboard Composites for Enhanced Structural Properties and Fire/Water Resistance," 2014 AIChE Annual Meeting, Materials Engineering and Sciences Division, Characterization of Composites, 4 pages <https://www.aiche.org/conferences/aiche-annual-meeting/2014/proceeding/paper/174h-microstructure-characterization-magnesium-oxide-based-wallboard-composites-enhanced-structural-1>.
Chen Xuefei et al., "Research on the Mechanism of Water Resistance of Magnesium Oxychloride Concrete with Phosphoric Acid," Concrete, pp. 68-71, Feb. 28, 2018, 4 pages.
ASTM E136 (Standard Test Method for Assessing Combustibility of Materials Using a Vertical Tube Furnace at 750° C., as defined in the 2012, 2015 and 2018 IBC Model Codes), 2 Scope pages.
Gochez, et al., "Phosphoric acid-modified magnesium oxychloride: Study of water stability, kinetics, and pair distribution function," J.Am.Ceram.Soc. 2019; 102, 3728-3737 (Year 2019), 10 pages.
International Preliminary Report on Patentability, International Application No. PCT/US2018/067796, dated Dec. 15, 2020, 14 pages.
International Search Report, International Application No. PCT/US2018/067796, dated Mar. 27, 2019, 2 pages.
Li, Y. et al. "The influence of FeSO4 and KH2PO4 on the performance of magnesium oxychloride cement". Construction and Building Materials 102 (2016) 233-238. (Year: 2016).

* cited by examiner

Figure 1B:
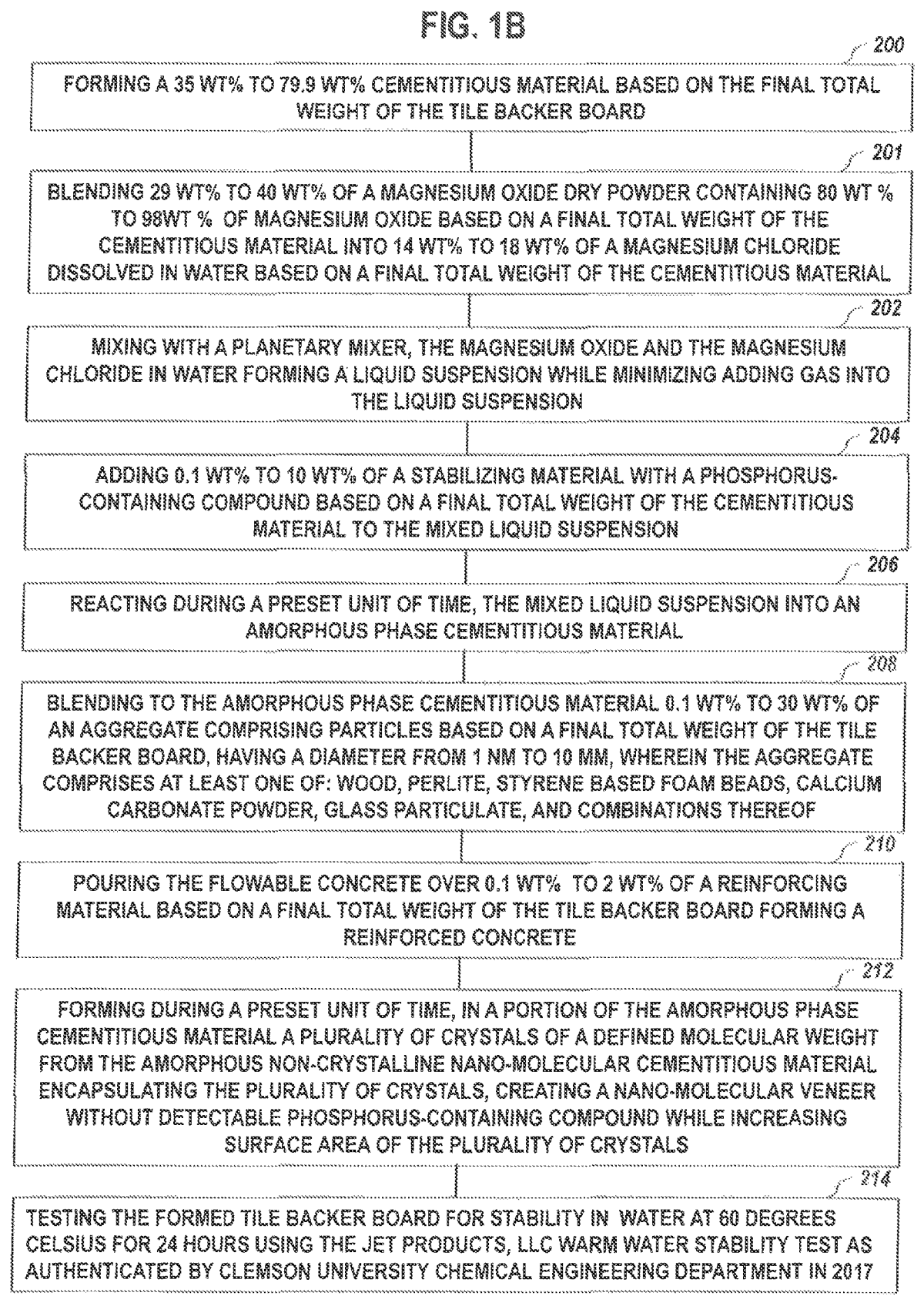

200
FORMING A 35 WT% TO 79.9 WT% CEMENTITIOUS MATERIAL BASED ON THE FINAL TOTAL WEIGHT OF THE TILE BACKER BOARD

201
BLENDING 29 WT% TO 40 WT% OF A MAGNESIUM OXIDE DRY POWDER CONTAINING 80 WT % TO 98WT % OF MAGNESIUM OXIDE BASED ON A FINAL TOTAL WEIGHT OF THE CEMENTITIOUS MATERIAL INTO 14 WT% TO 18 WT% OF A MAGNESIUM CHLORIDE DISSOLVED IN WATER BASED ON A FINAL TOTAL WEIGHT OF THE CEMENTITIOUS MATERIAL

202
MIXING WITH A PLANETARY MIXER, THE MAGNESIUM OXIDE AND THE MAGNESIUM CHLORIDE IN WATER FORMING A LIQUID SUSPENSION WHILE MINIMIZING ADDING GAS INTO THE LIQUID SUSPENSION

204
ADDING 0.1 WT% TO 10 WT% OF A STABILIZING MATERIAL WITH A PHOSPHORUS-CONTAINING COMPOUND BASED ON A FINAL TOTAL WEIGHT OF THE CEMENTITIOUS MATERIAL TO THE MIXED LIQUID SUSPENSION

206
REACTING DURING A PRESET UNIT OF TIME, THE MIXED LIQUID SUSPENSION INTO AN AMORPHOUS PHASE CEMENTITIOUS MATERIAL

208
BLENDING TO THE AMORPHOUS PHASE CEMENTITIOUS MATERIAL 0.1 WT% TO 30 WT% OF AN AGGREGATE COMPRISING PARTICLES BASED ON A FINAL TOTAL WEIGHT OF THE TILE BACKER BOARD, HAVING A DIAMETER FROM 1 NM TO 10 MM, WHEREIN THE AGGREGATE COMPRISES AT LEAST ONE OF: WOOD, PERLITE, STYRENE BASED FOAM BEADS, CALCIUM CARBONATE POWDER, GLASS PARTICULATE, AND COMBINATIONS THEREOF

210
POURING THE FLOWABLE CONCRETE OVER 0.1 WT% TO 2 WT% OF A REINFORCING MATERIAL BASED ON A FINAL TOTAL WEIGHT OF THE TILE BACKER BOARD FORMING A REINFORCED CONCRETE

212
FORMING DURING A PRESET UNIT OF TIME, IN A PORTION OF THE AMORPHOUS PHASE CEMENTITIOUS MATERIAL A PLURALITY OF CRYSTALS OF A DEFINED MOLECULAR WEIGHT FROM THE AMORPHOUS NON-CRYSTALLINE NANO-MOLECULAR CEMENTITIOUS MATERIAL ENCAPSULATING THE PLURALITY OF CRYSTALS, CREATING A NANO-MOLECULAR VENEER WITHOUT DETECTABLE PHOSPHORUS-CONTAINING COMPOUND WHILE INCREASING SURFACE AREA OF THE PLURALITY OF CRYSTALS

214
TESTING THE FORMED TILE BACKER BOARD FOR STABILITY IN WATER AT 60 DEGREES CELSIUS FOR 24 HOURS USING THE JET PRODUCTS, LLC WARM WATER STABILITY TEST AS AUTHENTICATED BY CLEMSON UNIVERSITY CHEMICAL ENGINEERING DEPARTMENT IN 2017

Figure 1D:
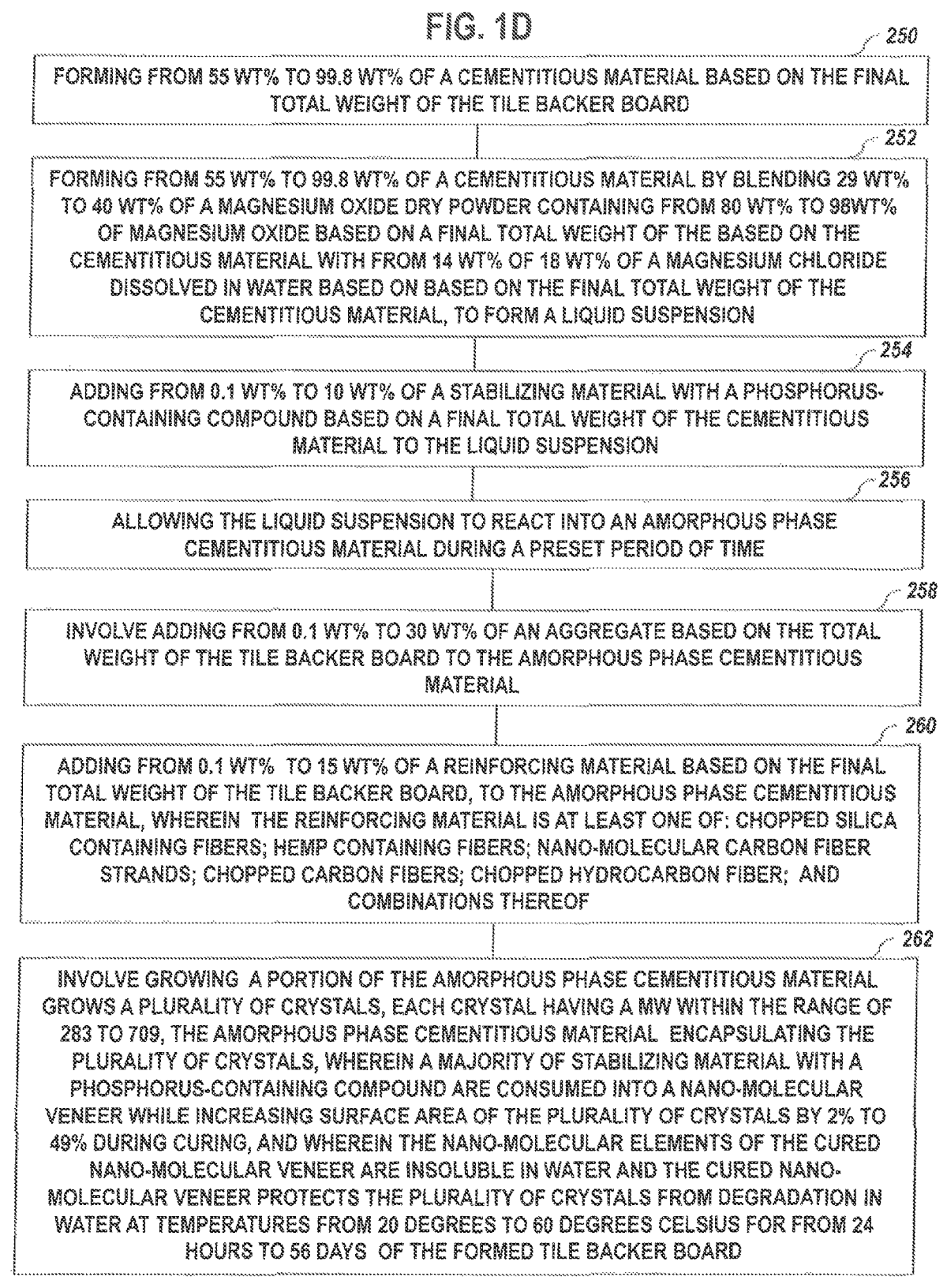

FORMING FROM 55 WT% TO 99.8 WT% OF A CEMENTITIOUS MATERIAL BASED ON THE FINAL TOTAL WEIGHT OF THE TILE BACKER BOARD

252

FORMING FROM 55 WT% TO 99.8 WT% OF A CEMENTITIOUS MATERIAL BY BLENDING 29 WT% TO 40 WT% OF A MAGNESIUM OXIDE DRY POWDER CONTAINING FROM 80 WT% TO 98WT% OF MAGNESIUM OXIDE BASED ON A FINAL TOTAL WEIGHT OF THE BASED ON THE CEMENTITIOUS MATERIAL WITH FROM 14 WT% OF 18 WT% OF A MAGNESIUM CHLORIDE DISSOLVED IN WATER BASED ON BASED ON THE FINAL TOTAL WEIGHT OF THE CEMENTITIOUS MATERIAL, TO FORM A LIQUID SUSPENSION

254

ADDING FROM 0.1 WT% TO 10 WT% OF A STABILIZING MATERIAL WITH A PHOSPHORUS-CONTAINING COMPOUND BASED ON A FINAL TOTAL WEIGHT OF THE CEMENTITIOUS MATERIAL TO THE LIQUID SUSPENSION

256

ALLOWING THE LIQUID SUSPENSION TO REACT INTO AN AMORPHOUS PHASE CEMENTITIOUS MATERIAL DURING A PRESET PERIOD OF TIME

258

INVOLVE ADDING FROM 0.1 WT% TO 30 WT% OF AN AGGREGATE BASED ON THE TOTAL WEIGHT OF THE TILE BACKER BOARD TO THE AMORPHOUS PHASE CEMENTITIOUS MATERIAL

260

ADDING FROM 0.1 WT% TO 15 WT% OF A REINFORCING MATERIAL BASED ON THE FINAL TOTAL WEIGHT OF THE TILE BACKER BOARD, TO THE AMORPHOUS PHASE CEMENTITIOUS MATERIAL, WHEREIN THE REINFORCING MATERIAL IS AT LEAST ONE OF: CHOPPED SILICA CONTAINING FIBERS; HEMP CONTAINING FIBERS; NANO-MOLECULAR CARBON FIBER STRANDS; CHOPPED CARBON FIBERS; CHOPPED HYDROCARBON FIBER; AND COMBINATIONS THEREOF

262

INVOLVE GROWING A PORTION OF THE AMORPHOUS PHASE CEMENTITIOUS MATERIAL GROWS A PLURALITY OF CRYSTALS, EACH CRYSTAL HAVING A MW WITHIN THE RANGE OF 283 TO 709, THE AMORPHOUS PHASE CEMENTITIOUS MATERIAL ENCAPSULATING THE PLURALITY OF CRYSTALS, WHEREIN A MAJORITY OF STABILIZING MATERIAL WITH A PHOSPHORUS-CONTAINING COMPOUND ARE CONSUMED INTO A NANO-MOLECULAR VENEER WHILE INCREASING SURFACE AREA OF THE PLURALITY OF CRYSTALS BY 2% TO 49% DURING CURING, AND WHEREIN THE NANO-MOLECULAR ELEMENTS OF THE CURED NANO-MOLECULAR VENEER ARE INSOLUBLE IN WATER AND THE CURED NANO-MOLECULAR VENEER PROTECTS THE PLURALITY OF CRYSTALS FROM DEGRADATION IN WATER AT TEMPERATURES FROM 20 DEGREES TO 60 DEGREES CELSIUS FOR FROM 24 HOURS TO 56 DAYS OF THE FORMED TILE BACKER BOARD

FIG. 3A

CEMENTITIOUS MATERIAL

| STARTING MATERIAL | Sample 1 | Sample 2 |
|---|---|---|
| MAGNESIUM OXIDE DRY POWDER IN CEMENTITIOUS MATERIAL | 29 wt% | 40 wt% |
| MAGNESIUM CHLORIDE DISSOLVED IN WATER IN CEMENTITIOUS MATERIAL | 14 wt% | 18 wt% |
| STABILIZING MATERIAL WITH PHOSPHORUS-CONTAINING COMPOUND IN CEMENTITIOUS MATERIAL (PHOSPHORIC ACID) | 0 wt% | 10 wt% |
| STABILIZING MATERIAL WITH PHOSPHORUS-CONTAINING COMPOUND IN CEMENTITIOUS MATERIAL (PHOSPHOROUS ACID) | 0.1 wt% | 0 wt% |
| REINFORCING COMPONENT IN FORMULATION (WOVEN SILICA CONTAINING COMPOUND) | 0 wt% | 0 wt% |
| AGGREGATE IN FORMULATION | 0 wt% | 0 wt% |
| BIOMASS IN FORMULATION | 0 wt% | 0 wt% |
| SURFACTANT IN FORMULATION | 0 wt% | 0 wt% |
| RE-DISPERSIBLE POLYMER POWDER IN FORMULATION | 0 wt% | 0 wt% |
| ACRYLIC IN FORMULATION | 0 wt% | 0 wt% |
| STYRENE BUTADIENE RUBBER (SBR) IN FORMULATION | 0 wt% | 0 wt% |
| FINAL FORMULATION | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 85 wt% | 55 wt% |
| AMORPHOUS PHASE CEMENTITIOUS MATERIAL AS DETERMINED BY X RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 12 wt% | 43 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 2wt% | 4.5 wt% |
| MAGNESIUM CRYSTAL CONTENT OF THE CEMENTITIOUS MATERIAL PERCENTAGE RETAINED | 2% | 81% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQWIN AUTOMATED SORPTION DATA ACQUISITION AND REDUCTION | 20 $m^2/g$ | 29 $m^2/g$ |

A) WOOD, PERLITE, STYRENE FOAM BEADS IN A 30:8:1 RATIO

B) VINYL ACETATE ETHYLENE

FIG. 3B

CEMENTITIOUS MATERIAL

| *STARTING MATERIAL* | Sample 3 | Sample 4 |
|---|---|---|
| MAGNESIUM OXIDE DRY POWDER IN CEMENTITIOUS MATERIAL | 32 wt% | 31 wt% |
| MAGNESIUM CHLORIDE DISSOLVED IN WATER IN CEMENTITIOUS MATERIAL | 17 wt% | 16 wt% |
| STABILIZING MATERIAL WITH PHOSPHORUS-CONTAINING COMPOUND IN CEMENTITIOUS MATERIAL (PHOSPHORIC ACID) | 0.1 wt% | 1 wt% |
| STABILIZING MATERIAL WITH PHOSPHORUS-CONTAINING COMPOUND IN CEMENTITIOUS MATERIAL (PHOSPHOROUS ACID) | 0 wt% | 0 wt% |
| REINFORCING COMPONENT IN FORMULATION (WOVEN SILICA CONTAINING COMPOUND) | 0.1 wt% Non-Woven Silica-Containing Mat | 2 wt% Chopped Silica Fibers |
| AGGREGATE IN FORMULATION | 0 wt% | 0 wt% |
| BIOMASS IN FORMULATION | 0 wt% | 0 wt% |
| SURFACTANT IN FORMULATION | 0 wt% | 0 wt% |
| RE-DISPERSIBLE POLYMER POWDER IN FORMULATION | 0 wt% | 0 wt% |
| ACRYLIC IN FORMULATION | 0 wt% | 0 wt% |
| STYRENE BUTADIENE RUBBER (SBR) IN FORMULATION | 0 wt% | 0 wt% |
| *FINAL FORMULATION* | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 87 wt% | 80 wt% |
| AMORPHOUS PHASE CEMENTITIOUS MATERIAL AS DETERMINED BY X-RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 10 wt% | 17 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 2 wt% | 13 wt% |
| MAGNESIUM CRYSTAL CONTENT OF THE CEMENTITIOUS MATERIAL PERCENTAGE RETAINED | 2 wt% | 16% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQWIN AUTOMATED SORPTION DATA ACQUISITION AND REDUCTION | 20 $m^2/g$ | 24 $m^2/g$ |

A WOOD, PERLITE, STYRENE FOAM BEADS IN A 30:8:1 RATIO

B) VINYL ACETATE ETHYLENE

FIG. 3C

CEMENTITIOUS MATERIAL

| *STARTING MATERIAL* | Sample 5 | Sample 6 |
|---|---|---|
| MAGNESIUM OXIDE DRY POWDER IN CEMENTITIOUS MATERIAL | 32.5 wt% | 33 wt% |
| MAGNESIUM CHLORIDE DISSOLVED IN WATER IN CEMENTITIOUS MATERIAL | 17.5 wt% | 18 wt% |
| STABILIZING MATERIAL WITH PHOSPHORUS-CONTAINING COMPOUND IN CEMENTITIOUS MATERIAL (PHOSPHORIC ACID) | 1.75 wt% | 2.5 wt% |
| STABILIZING MATERIAL WITH PHOSPHORUS-CONTAINING COMPOUND IN CEMENTITIOUS MATERIAL (PHOSPHOROUS ACID) | 0 wt% | 0 wt% |
| REINFORCING COMPONENT IN FORMULATION (WOVEN SILICA CONTAINING COMPOUND) | 0 wt% | 0 wt% |
| AGGREGATE IN FORMULATION | 0.1 wt% [A] | 30 wt% [A] |
| BIOMASS IN FORMULATION | 0 wt% | 0 wt% |
| SURFACTANT IN FORMULATION | 0 wt% | 0 wt% |
| RE-DISPERSIBLE POLYMER POWDER IN FORMULATION | 0 wt% | 0 wt% |
| ACRYLIC IN FORMULATION | 0 wt% | 0 wt% |
| STYRENE BUTADIENE RUBBER (SBR) IN FORMULATION | 0 wt% | 0 wt% |
| *FINAL FORMULATION* | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 77 wt% | 74 wt% |
| AMORPHOUS PHASE CEMENTITIOUS MATERIAL AS DETERMINED BY X-RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 21 wt% | 24 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 35 wt% | 51 wt% |
| MAGNESIUM CRYSTAL CONTENT OF THE CEMENTITIOUS MATERIAL PERCENTAGE RETAINED | 46% | 69% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQWIN AUTOMATED SORPTION DATA ACQUISITION AND REDUCTION | 27 $m^2/g$ | 29 $m^2/g$ |

A WOOD, PERLITE, STYRENE FOAM BEADS IN A 30:8:1 RATIO

B) VINYL ACETATE ETHYLENE

FIG. 3D

CEMENTITIOUS MATERIAL

| *STARTING MATERIAL* | Sample 7 | Sample 8 |
|---|---|---|
| MGO DRY POWDER IN CEMENTITIOUS MATERIAL | 33 wt% | 32 wt% |
| MAGNESIUM CHLORIDE DISSOLVED IN WATER IN CEMENTITIOUS MATERIAL | 19 wt% | 17 wt% |
| STABILIZING MATERIAL WITH PHOSPHORUS-CONTAINING COMPOUND IN CEMENTITIOUS MATERIAL (PHOSPHORIC ACID) | 3.75 wt% | 5 wt% |
| STABILIZING MATERIAL WITH PHOSPHORUS-CONTAINING COMPOUND IN CEMENTITIOUS MATERIAL (PHOSPHOROUS ACID) | 0 wt% | 0 wt% |
| REINFORCING COMPONENT IN FORMULATION | 0 wt% | 0 wt% |
| AGGREGATE IN FORMULATION | 0 wt% | 0 wt% |
| BIOMASS IN FORMULATION | 0.1 wt% Rice Husks | 15 wt% Corn Husks |
| SURFACTANT IN FORMULATION | 0 wt% | 0 wt% |
| RE-DISPERSIBLE POLYMER POWDER IN FORMULATION | 0 wt% | 0 wt% |
| ACRYLIC IN FORMULATION | 0 wt% | 0 wt% |
| STYRENE BUTADIENE RUBBER (SBR) IN FORMULATION | 0 wt% | 0 wt% |
| *FINAL FORMULATION* | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 70 wt% | 67 wt% |
| AMORPHOUS PHASE CEMENTITIOUS MATERIAL AS DETERMINED BY X RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 28 wt% | 31 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 51 wt% | 48 wt% |
| MAGNESIUM CRYSTAL CONTENT OF THE CEMENTITIOUS MATERIAL PERCENTAGE RETAINED | 73% | 72% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQWIN AUTOMATED SORPTION DATA ACQUISITION AND REDUCTION | 29 $m^2/g$ | 28 $m^2/g$ |

A) WOOD, PERLITE, STYRENE FOAM BEADS IN A 30:8:1 RATIO

B) VINYL ACETATE ETHYLENE

FIG. 3E

CEMENTITIOUS MATERIAL

| *STARTING MATERIAL* | Sample 9 | Sample 10 |
|---|---|---|
| MGO DRY POWDER IN CEMENTITIOUS MATERIAL | 35 wt% | 30 wt% |
| MAGNESIUM CHLORIDE DISSOLVED IN WATER IN CEMENTITIOUS MATERIAL | 16 wt% | 18 wt% |
| STABILIZING MATERIAL WITH PHOSPHORUS-CONTAINING COMPOUND IN CEMENTITIOUS MATERIAL (PHOSPHORIC ACID) | 6.25 wt% | 7.5 wt% |
| STABILIZING MATERIAL WITH PHOSPHORUS-CONTAINING COMPOUND IN CEMENTITIOUS MATERIAL (PHOSPHOROUS ACID) | 0 wt% | 0 wt% |
| REINFORCING COMPONENT IN FORMULATION | 0 wt% | 0 wt% |
| AGGREGATE IN FORMULATION | 0 wt% | 0 wt% |
| BIOMASS IN FORMULATION | 0 wt% | 0 wt% |
| SURFACTANT IN FORMULATION | 0.1 wt% Detergent | 10 wt% Sodium Stearate |
| RE-DISPERSIBLE POLYMER POWDER IN FORMULATION | 0 wt% | 0 wt% |
| ACRYLIC IN FOTMULATION | 0 wt% | 0 wt% |
| STYRENE BUTADIENE RUBBER (SBR) IN IN FORMULATION | 0 wt% | 0 wt% |
| *FINAL FORMULATION* | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 64 wt% | 61 wt% |
| AMORPHOUS PHASE CEMENTITIOUS MATERIAL AS DETERMINED BY X-RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 34 wt% | 37 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 47 wt% | 43 wt% |
| MAGNESIUM CRYSTAL CONTENT OF THE CEMENTITIOUS MATERIAL PERCENTAGE RETAINED | 73% | 70% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQWIN AUTOMATED SORPTION DATA ACQUISITION AND REDUCTION | 24 $m^2/g$ | 27 $m^2/g$ |

A) WOOD, PERLITE, STYRENE FOAM BEADS IN A 30:8:1 RATIO

B) VINYL ACETATE ETHYLENE

FIG. 3F

CEMENTITIOUS MATERIAL

| *STARTING MATERIAL* | Sample 11 | Sample 12 |
|---|---|---|
| MGO DRY POWDER IN CEMENTITIOUS MATERIAL | 33 wt% | 32 wt% |
| MAGNESIUM CHLORIDE DISSOLVED IN WATER IN CEMENTITIOUS MATERIAL | 15 wt% | 19 wt% |
| STABILIZING MATERIAL WITH PHOSPHORUS-CONTAINING COMPOUND IN CEMENTITIOUS MATERIAL (PHOSPHORIC ACID) | 8.75 wt% | 10 wt% |
| STABILIZING MATERIAL WITH PHOSPHORUS-CONTAINING COMPOUND IN CEMENTITIOUS MATERIAL (PHOSPHOROUS ACID) | 0 wt% | 0 wt% |
| REINFORCING COMPONENT IN FORMULATION | 0 wt% | 0 wt% |
| AGGREGATE IN FORMULATION | 0 wt% | 0 wt% |
| BIOMASS IN FORMULATION | 0 wt% | 0 wt% |
| SURFACTANT IN FORMULATION | 0 wt% | 0 wt% |
| RE-DISPERSIBLE POLYMER POWDER IN FORMULATION | 0.1 wt% VAE[B] | 5 wt% VAE[B] |
| ACRYLIC IN FORMULATION | 0 wt% | 0 wt% |
| STYRENE BUTADIENE RUBBER (SBR) IN FORMULATION | 0 wt% | 0 wt% |
| *FINAL FORMULATION* | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 57 wt% | 50 wt% |
| AMORPHOUS PHASE CEMENTITIOUS MATERIAL AS DETERMINED BY X-RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 41 wt% | 48 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 41 wt% | 45 wt% |
| MAGNESIUM CRYSTAL CONTENT OF THE CEMENTITIOUS MATERIAL PERCENTAGE RETAINED | 72% | 90% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQWIN AUTOMATED SORPTION DATA ACQUISITION AND REDUCTION | 29 $m^2/g$ | 29 $m^2/g$ |

A) WOOD, PERLITE, STYRENE FOAM BEADS IN A 30:8:1 RATIO

B) VINYL ACETATE ETHYLENE

FIG. 3G

CEMENTITIOUS MATERIAL

| *STARTING MATERIAL* | Sample 13 | Sample 14 |
|---|---|---|
| MAGNESIUM OXIDE DRY POWDER IN CEMENTITIOUS MATERIAL | 31 wt% | 36 wt% |
| MAGNESIUM CHLORIDE DISSOLVED IN WATER IN CEMENTITIOUS MATERIAL | 14 wt% | 18 wt% |
| STABILIZING MATERIAL WITH PHOSPHORUS-CONTAINING COMPOUND IN CEMENTITIOUS MATERIAL (PHOSPHORIC ACID) | 0 wt% | 2 wt% |
| STABILIZING MATERIAL WITH PHOSPHORUS-CONTAINING COMPOUND IN CEMENTITIOUS MATERIAL (PHOSPHOROUS ACID) | 1 wt% | 0 wt% |
| REINFORCING COMPONENT IN FORMULATION (WOVEN SILICA CONTAINING COMPOUND) | 0 wt% | 0 wt% |
| AGGREGATE IN FORMULATION | 0 wt% | 0 wt% |
| BIOMASS IN FORMULATION | 0 wt% | 0 wt% |
| SURFACTANT IN FORMULATION | 0 wt% | 0 wt% |
| RE-DISPERSIBLE POLYMER POWDER IN FORMULATION | 0 wt% | 0 wt% |
| ACRYLIC IN FORMULATION | 0.1 wt% Acrylic | 0.1 wt% Acrylic |
| STYRENE BUTADIENE RUBBER (SBR) IN FORMULATION | 0 wt% | 0 wt% |
| *FINAL FORMULATION* | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 75 wt% | 73 wt% |
| AMORPHOUS PHASE CEMENTITIOUS MATERIAL AS DETERMINED BY X-RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 23 wt% | 25 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 34 wt% | 50 wt% |
| MAGNESIUM CRYSTAL CONTENT OF THE CEMENTITIOUS MATERIAL PERCENTAGE RETAINED | 45% | 68% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQWIN AUTOMATED SORPTION DATA ACQUISITION AND REDUCTION | 26 $m^2/g$ | 29 $m^2/g$ |

A) WOOD, PERLITE, STYRENE FOAM BEADS IN A 30:8:1 RATIO

B) VINYL ACETATE ETHYLENE

FIG. 3H

CEMENTITIOUS MATERIAL

| *STARTING MATERIAL* | Sample 15 | Sample 16 |
|---|---|---|
| MAGNESIUM OXIDE DRY POWDER IN CEMENTITIOUS MATERIAL | 32 wt% | 31 wt% |
| MAGNESIUM CHLORIDE DISSOLVED IN WATER IN CEMENTITIOUS MATERIAL | 17 wt% | 16 wt% |
| STABILIZING MATERIAL WITH PHOSPHORUS-CONTAINING COMPOUND IN CEMENTITIOUS MATERIAL (PHOSPHORIC ACID) | 4 wt% | 3 wt% |
| STABILIZING MATERIAL WITH PHOSPHORUS-CONTAINING COMPOUND IN CEMENTITIOUS MATERIAL (PHOSPHOROUS ACID) | 0 wt% | 0 wt% |
| REINFORCING COMPONENT IN FORMULATION (WOVEN SILICA CONTAINING COMPOUND) | 0 wt% | 0 wt% |
| AGGREGATE IN FORMULATION | 0 wt% | 0 wt% |
| BIOMASS IN FORMULATION | 0 wt% | 0 wt% |
| SURFACTANT IN FORMULATION | 0 wt% | 0 wt% |
| RE-DISPERSIBLE POLYMER POWDER IN FORMULATION | 0 wt% | 0 wt% |
| ACRYLIC IN FORMULATION | 0 wt% | 0 wt% |
| STYRENE BUTADIENE RUBBER (SBR) IN FORMULATION | 0.1 wt% SBR | 5 wt% SBR |
| *FINAL FORMULATION* | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 69 wt% | 66 wt% |
| AMORPHOUS PHASE CEMENTITIOUS MATERIAL AS DETERMINED BY X-RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 29 wt% | 32 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 49 wt% | 48 wt% |
| MAGNESIUM CRYSTAL CONTENT OF THE CEMENTITIOUS MATERIAL PERCENTAGE RETAINED | 71% | 73% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQWIN AUTOMATED SORPTION DATA ACQUISITION AND REDUCTION | 29 $m^2/g$ | 29 $m^2/g$ |

A) WOOD, PERLITE, STYRENE FOAM BEADS IN A 30:8:1 RATIO

B) VINYL ACETATE ETHYLENE

FIG. 3I

TILE BACKER BOARD

| *STARTING MATERIAL* | Sample 1 | Sample 2 |
|---|---|---|
| MGO DRY POWDER WT% IN CEMENTITIOUS MATERIAL | 29 wt% | 40 wt% |
| MAGNESIUM CHLORIDE WT% DISSOLVED IN WATER IN CEMENTITIOUS MATERIAL | 14 wt% | 18 wt% |
| STABILIZING MATERIAL WITH PHOSPHORUS-CONTAINING COMPOUND WT% IN CEMENTITIOUS MATERIAL (PHOSPHORIC ACID) | 0 wt% | 10 wt% |
| STABILIZING MATERIAL WITH PHOSPHORUS-CONTAINING COMPOUND WT% IN CEMENTITIOUS MATERIAL (PHOSPHOROUS ACID) | 0.1 wt% | 0 wt% |
| REINFORCING COMPONENT WT% IN TILE BACKER BOARD | 0.1 wt% Non-woven Silica-Containing Mat | 2wt% Woven Silica-Containing Mat |
| AGGREGATE WT% IN TILE BACKER BOARD | 0.1 wt% Wood | 30 wt% Wood |
| BIOMASS WT% IN TILE BACKER BOARD | 0 wt% | 0 wt% |
| SURFACTANT WT% IN TILE BACKER BOARD | 0 wt% | 0 wt% |
| RE-DISPERSIBLE POLYMER POWDER WT% IN TILE BACKER BOARD | 0 wt% | 0 wt% |
| ACRYLIC WT% IN TILE BACKER BOARD | 0 wt% | 0 wt% |
| STYRENE BUTADIENE RUBBER (SBR) WT% IN TILE BACKER BOARD | 0 wt% | 0 wt% |
| *FINAL FORMULATION* | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 86 wt% | 82 wt% |
| AMORPHOUS PHASE CEMENTITIOUS MATERIAL AS DETERMINED BY X-RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 12 wt% | 16 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 0 wt% | 70 wt% |
| MAGNESIUM CRYSTAL CONTENT OF THE CEMENTITIOUS MATERIAL PERCENTAGE RETAINED | 0% | 85% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQwin AUTOMATED SORPTION DATA ACQUISITION AND REDUCTION | 20 $m^2/g$ | 29 $m^2/g$ |
| PERCENT SURFACE AREA INCREASED | 2% | 49% |
| FLEXURAL STRENGTH | 7 | 7.5 |
| FLEXURAL STRENGTH AFTER 60C SOAK AT 24 HOURS | 3 | 3.4 |
| FLEXURAL STRENGTH RETAINED | 43% | 45% |

A) WOOD, PERLITE, STYRENE FOAM BEADS IN A 30:8:1 RATIO

B) VINYL ACETATE ETHYLENE

FIG. 3J

TILE BACKER BOARD

| *STARTING MATERIAL* | Sample 3 | Sample 4 |
|---|---|---|
| MGO DRY POWDER WT% IN CEMENTITIOUS MATERIAL | 32 wt% | 31 wt% |
| MAGNESIUM CHLORIDE WT% DISSOLVED IN WATER IN CEMENTITIOUS MATERIAL | 17 wt% | 16 wt% |
| STABILIZING MATERIAL WITH PHOSPHORUS-CONTAINING COMPOUND WT% IN CEMENTITIOUS MATERIAL (PHOSPHORIC ACID) | 0.1 wt% | 1 wt% |
| STABILIZING MATERIAL WITH PHOSPHORUS-CONTAINING COMPOUND WT% IN CEMENTITIOUS MATERIAL (PHOSPHOROUS ACID) | 0 wt% | 0 wt% |
| REINFORCING COMPONENT WT% IN TILE BACKER BOARD | 0.1 wt% Non-woven Hydrocarbon-Containing Mat | 0.1 wt% Woven Hydrocarbon-Containing Mat |
| AGGREGATE WT% IN TILE BACKER BOARD | 15 wt% Perlite | 15 wt% Perlite |
| BIOMASS WT% IN TILE BACKER BOARD | 0.1 wt% Rice Husks | 15 wt% Corn Husks |
| SURFACTANT WT% IN TILE BACKER BOARD | 0 wt% | 0 wt% |
| RE-DISPERSIBLE POLYMER POWDER WT% IN TILE BACKER BOARD | 0 wt% | 0 wt% |
| ACRYLIC WT% IN TILE BACKER BOARD | 0 wt% | 0 wt% |
| STYRENE BUTADIENE RUBBER (SBR) WT% IN TILE BACKER BOARD | 0 wt% | 0 wt% |
| *FINAL FORMULATION* | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 87 wt% | 80 wt% |
| AMORPHOUS PHASE CEMENTITIOUS MATERIAL AS DETERMINED BY X-RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 10 wt% | 17 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 2 wt% | 13 wt% |
| MAGNESIUM CRYSTAL CONTENT OF THE CEMENTITIOUS MATERIAL PERCENTAGE RETAINED | 2 wt% | 16% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQwin AUTOMATED SORPTION DATA ACQUISITION AND REDUCTION | 20 $m^2/g$ | 24 $m^2/g$ |
| PERCENT SURFACE AREA INCREASED | 2% | 23% |
| FLEXURAL STRENGTH | 8.5 | 8.2 |
| FLEXURAL STRENGTH AFTER 60C SOAK AT 24 HOURS | 6 | 7 |
| FLEXURAL STRENGTH RETAINED | 71% | 85% |

A) WOOD, PERLITE, STYRENE FOAM BEADS IN A 30:8:1 RATIO

B) VINYL ACETATE ETHYLENE

FIG. 3K

TILE BACKER BOARD

| *STARTING MATERIAL* | Sample 5 | Sample 6 |
|---|---|---|
| MGO DRY POWDER WT% IN CEMENTITIOUS MATERIAL | 32.5 wt% | 33 wt% |
| MAGNESIUM CHLORIDE WT% DISSOLVED IN WATER IN CEMENTITIOUS MATERIAL | 17.5 wt% | 18 wt% |
| STABILIZING MATERIAL WITH PHOSPHORUS-CONTAINING COMPOUND WT% IN CEMENTITIOUS MATERIAL (PHOSPHORIC ACID) | 1.75 wt% | 2.5 wt% |
| STABILIZING MATERIAL WITH PHOSPHORUS-CONTAINING COMPOUND WT% IN CEMENTITIOUS MATERIAL (PHOSPHOROUS ACID) | 0 wt% | 0 wt% |
| REINFORCING COMPONENT WT% IN TILE BACKER BOARD | 0.1 wt% Non-woven Silica-Containing Mat "and 1% Chopped Silica-Containing Fibers" | 0.1wt% Woven Silica-Containing Mat "and 10% Chopped Silica-Containing Fibers |
| AGGREGATE WT% IN TILE BACKER BOARD | 1% | 15 wt% Glass Particulate |
| BIOMASS WT% IN TILE BACKER BOARD | 0 wt% | 0 wt% |
| SURFACTANT WT% IN TILE BACKER BOARD | 0.1 wt% Detergent | 10 wt% Sodium Stearate |
| RE-DISPERSIBLE POLYMER POWDER WT% IN TILE BACKER BOARD | 0 wt% | 0 wt% |
| ACRYLIC WT% IN TILE BACKER BOARD | 0 wt% | 0 wt% |
| STYRENE BUTADIENE RUBBER (SBR) WT% IN TILE BACKER BOARD | 0 wt% | 0 wt% |
| *FINAL FORMULATION* | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 77 wt% | 74 wt% |
| AMORPHOUS PHASE CEMENTITIOUS MATERIAL AS DETERMINED BY X-RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 21 wt% | 24 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 35 wt% | 51 wt% |
| MAGNESIUM CRYSTAL CONTENT OF THE CEMENTITIOUS MATERIAL PERCENTAGE RETAINED | 46% | 69% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQwin AUTOMATED SORPTION DATA ACQUISITION AND REDUCTION | 27 $m^2/g$ | 29 $m^2/g$ |
| PERCENT SURFACE AREA INCREASED | 38% | 49% |
| FLEXURAL STRENGTH | 8 | 7.8 |
| FLEXURAL STRENGTH AFTER 60C SOAK AT 24 HOURS | 7.1 | 7.3 |
| FLEXURAL STRENGTH RETAINED | 89% | 94% |

A) WOOD, PERLITE, STYRENE FOAM BEADS IN A 30:8:1 RATIO

B) VINYL ACETATE ETHYLENE

FIG. 3L

TILE BACKER BOARD

| *STARTING MATERIAL* | Sample 7 | Sample 8 |
|---|---|---|
| MGO DRY POWDER WT% IN CEMENTITIOUS MATERIAL | 33 wt% | 32 wt% |
| MAGNESIUM CHLORIDE WT% DISSOLVED IN WATER IN CEMENTITIOUS MATERIAL | 19 wt% | 17 wt% |
| STABILIZING MATERIAL WITH PHOSPHORUS-CONTAINING COMPOUND WT% IN CEMENTITIOUS MATERIAL (PHOSPHORIC ACID) | 3.75 wt% | 5 wt% |
| STABILIZING MATERIAL WITH PHOSPHORUS-CONTAINING COMPOUND WT% IN CEMENTITIOUS MATERIAL (PHOSPHOROUS ACID) | 0 wt% | 0 wt% |
| REINFORCING COMPONENT WT% IN TILE BACKER BOARD | 0.1 wt% Woven Hydrocarbon-Containing Mat | 0.1 wt% Non-woven Silica-Containing Mat |
| AGGREGATE WT% IN TILE BACKER BOARD | 11 wt%[A] | 12 wt%[A] |
| BIOMASS WT% IN TILE BACKER BOARD | 0 wt% | 0 wt% |
| SURFACTANT WT% IN TILE BACKER BOARD | 0 wt% | 0 wt% |
| RE-DISPERSIBLE POLYMER POWDER WT% IN TILE BACKER BOARD | 0.1 wt% VAE[B] | 5 wt% VAE[B] |
| ACRYLIC WT% IN TILE BACKER BOARD | 0 wt% | 0 wt% |
| STYRENE BUTADIENE RUBBER (SBR) WT% IN TILE BACKER BOARD | 0 wt% | 0 wt% |
| *FINAL FORMULATION* | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 70 wt% | 67 wt% |
| AMORPHOUS PHASE CEMENTITIOUS MATERIAL AS DETERMINED BY X-RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 28 wt% | 31 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 51 wt% | 48 wt% |
| MAGNESIUM CRYSTAL CONTENT OF THE CEMENTITIOUS MATERIAL PERCENTAGE RETAINED | 73% | 72% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQwin AUTOMATED SORPTION DATA ACQUISITION AND REDUCTION | 29 $m^2/g$ | 28 $m^2/g$ |
| PERCENT SURFACE AREA INCREASED | 49% | 44% |
| FLEXURAL STRENGTH | 7.5 | 7.2 |
| FLEXURAL STRENGTH AFTER 60C SOAK AT 24 HOURS | 7.1 | 7 |
| FLEXURAL STRENGTH RETAINED | 95% | 97% |

A) WOOD, PERLITE, STYRENE FOAM BEADS IN A 30:8:1 RATIO

B) VINYL ACETATE ETHYLENE

FIG. 3M

TILE BACKER BOARD

| *STARTING MATERIAL* | Sample 9 | Sample 10 |
|---|---|---|
| MGO DRY POWDER WT% IN CEMENTITIOUS MATERIAL | 35 wt% | 30 wt% |
| MAGNESIUM CHLORIDE WT% DISSOLVED IN WATER IN CEMENTITIOUS MATERIAL | 16 wt% | 18 wt% |
| STABILIZING MATERIAL WITH PHOSPHORUS-CONTAINING COMPOUND WT% IN CEMENTITIOUS MATERIAL (PHOSPHORIC ACID) | 6.25 wt% | 7.5 wt% |
| STABILIZING MATERIAL WITH PHOSPHORUS-CONTAINING COMPOUND WT% IN CEMENTITIOUS MATERIAL (PHOSPHOROUS ACID) | 0 wt% | 0 wt% |
| REINFORCING COMPONENT WT% IN TILE BACKER BOARD | 0.1wt% Woven Silica-Containing Mat | 0.1 wt% Woven Hydrocarbon-Containing Mat |
| AGGREGATE WT% IN TILE BACKER BOARD | 13 wt%[A] | 14 wt%[A] |
| BIOMASS WT% IN TILE BACKER BOARD | 0 wt% | 0 wt% |
| SURFACTANT WT% IN TILE BACKER BOARD | 0 wt% | 0 wt% |
| RE-DISPERSIBLE POLYMER POWDER WT% IN TILE BACKER BOARD | 0 wt% | 0 wt% |
| ACRYLIC WT% IN TILE BACKER BOARD | 0.1 wt% Acrylic | 5 wt% Acrylic |
| STYRENE BUTADIENE RUBBER (SBR) WT% IN TILE BACKER BOARD | 0 wt% | 0 wt% |
| *FINAL FORMULATION* | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 64 wt% | 61 wt% |
| AMORPHOUS PHASE CEMENTITIOUS MATERIAL AS DETERMINED BY X-RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 34 wt% | 37 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 47 wt% | 43 wt% |
| MAGNESIUM CRYSTAL CONTENT OF THE CEMENTITIOUS MATERIAL PERCENTAGE RETAINED | 73% | 70% |
| SURFACE AREA OF THE CEMENTITIOUS MATERIAL AS DETERMINED USING NITROGEN ABSORPTION AND CALCULATED USING THE BRUNAUER--EMMETT--TELLER (BET) THEORY WITH QUANTACHROME ASIQwin AUTOMATED SORPTION DATA ACQUISITION AND REDUCTION | 24 $m^2/g$ | 27 $m^2/g$ |
| PERCENT SURFACE AREA INCREASED | 23% | 38% |
| FLEXURAL STRENGTH | 7 | 6.7 |
| FLEXURAL STRENGTH AFTER 60C SOAK AT 24 HOURS | 6.8 | 6.4 |
| FLEXURAL STRENGTH RETAINED | 97% | 96% |

A) WOOD, PERLITE, STYRENE FOAM BEADS IN A 30:8:1 RATIO

B) VINYL ACETATE ETHYLENE

FIG. 3N

TILE BACKER BOARD

| *STARTING MATERIAL* | Sample 11 | Sample 12 |
|---|---|---|
| MGO DRY POWDER WT% IN CEMENTITIOUS MATERIAL | 33 wt% | 32 wt% |
| MAGNESIUM CHLORIDE WT% DISSOLVED IN WATER IN CEMENTITIOUS MATERIAL | 15 wt% | 19 wt% |
| STABILIZING MATERIAL WITH PHOSPHORUS-CONTAINING COMPOUND WT% IN CEMENTITIOUS MATERIAL (PHOSPHORIC ACID) | 8.75 wt% | 10 wt% |
| STABILIZING MATERIAL WITH PHOSPHORUS-CONTAINING COMPOUND WT% IN CEMENTITIOUS MATERIAL (PHOSPHOROUS ACID) | 0 wt% | 0 wt% |
| REINFORCING COMPONENT WT% IN TILE BACKER BOARD | 0.1 wt% Non-woven Silica-Containing Mat | 0.1wt% Woven Silica-Containing Mat |
| AGGREGATE WT% IN TILE BACKER BOARD | 16 wt%[A] | 17 wt%[A] |
| BIOMASS WT% IN TILE BACKER BOARD | 0 wt% | 0 wt% |
| SURFACTANT WT% IN TILE BACKER BOARD | 0 wt% | 0 wt% |
| RE-DISPERSIBLE POLYMER POWDER WT% IN TILE BACKER BOARD | 0 wt% | 0 wt% |
| ACRYLIC WT% IN TILE BACKER BOARD | 0 wt% | 0 wt% |
| STYRENE BUTADIENE RUBBER (SBR) WT% IN TILE BACKER BOARD | 0.1 wt% SBR | 5 wt% SBR |
| *FINAL FORMULATION* | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 57 wt% | 50 wt% |
| AMORPHOUS PHASE CEMENTITIOUS MATERIAL AS DETERMINED BY X-RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 41 wt% | 48 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 41 wt% | 45 wt% |
| MAGNESIUM CRYSTAL CONTENT OF THE CEMENTITIOUS MATERIAL PERCENTAGE RETAINED | 72% | 90% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQwin AUTOMATED SORPTION DATA ACQUISITION AND REDUCTION | 29 $m^2/g$ | 29 $m^2/g$ |
| PERCENT SURFACE AREA INCREASED | 49% | 49% |
| FLEXURAL STRENGTH | 6.5 | 6.3 |
| FLEXURAL STRENGTH AFTER 60C SOAK AT 24 HOURS | 6.1 | 5.9 |
| FLEXURAL STRENGTH RETAINED | 94% | 94% |

A) WOOD, PERLITE, STYRENE FOAM BEADS IN A 30:8:1 RATIO

B) VINYL ACETATE ETHYLENE

FIG. 3O

TILE BACKER BOARD

| *STARTING MATERIAL* | Sample 13 | Sample 14 |
|---|---|---|
| MGO DRY POWDER WT% IN CEMENTITIOUS MATERIAL | 29 wt% | 40 wt% |
| MAGNESIUM CHLORIDE WT% DISSOLVED IN WATER IN CEMENTITIOUS MATERIAL | 14 wt% | 18 wt% |
| STABILIZING MATERIAL WITH PHOSPHORUS-CONTAINING COMPOUND WT% IN CEMENTITIOUS MATERIAL (PHOSPHORIC ACID) | 0 wt% | 10 wt% |
| STABILIZING MATERIAL WITH PHOSPHORUS-CONTAINING COMPOUND WT% IN CEMENTITIOUS MATERIAL (PHOSPHOROUS ACID) | 0.1 wt% | 0 wt% |
| REINFORCING COMPONENT WT% IN TILE BACKER BOARD | 0.1 wt% Chopped Silica-Containing Fibers | 15wt% Nano-molecular Carbon Fiber Strands |
| AGGREGATE WT% IN TILE BACKER BOARD | 0.1 wt% Wood | 30 wt% Wood |
| BIOMASS WT% IN TILE BACKER BOARD | 0 wt% | 0 wt% |
| SURFACTANT WT% IN TILE BACKER BOARD | 0 wt% | 0 wt% |
| RE-DISPERSIBLE POLYMER POWDER WT% IN TILE BACKER BOARD | 0 wt% | 0 wt% |
| ACRYLIC WT% IN TILE BACKER BOARD | 0 wt% | 0 wt% |
| STYRENE BUTADIENE RUBBER (SBR) WT% IN TILE BACKER BOARD | 0 wt% | 0 wt% |
| *FINAL FORMULATION* | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 83 wt% | 82 wt% |
| AMORPHOUS PHASE CEMENTITIOUS MATERIAL AS DETERMINED BY X-RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 15 wt% | 16 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 1 wt% | 71 wt% |
| MAGNESIUM CRYSTAL CONTENT OF THE CEMENTITIOUS MATERIAL PERCENTAGE RETAINED | 1% | 86% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQwin AUTOMATED SORPTION DATA ACQUISITION AND REDUCTION | 20 $m^2/g$ | 29 $m^2/g$ |
| PERCENT SURFACE AREA INCREASED | 2% | 49% |
| FLEXURAL STRENGTH | 7 | 7.5 |
| FLEXURAL STRENGTH AFTER 60C SOAK AT 24 HOURS | 3 | 3.4 |
| FLEXURAL STRENGTH RETAINED | 43% | 45% |

A) WOOD, PERLITE, STYRENE FOAM BEADS IN A 30:8:1 RATIO

B) VINYL ACETATE ETHYLENE

FIG. 3P

TILE BACKER BOARD

| *STARTING MATERIAL* | Sample 15 | Sample 16 |
|---|---|---|
| MGO DRY POWDER WT% IN CEMENTITIOUS MATERIAL | 32 wt% | 31 wt% |
| MAGNESIUM CHLORIDE WT% DISSOLVED IN WATER IN CEMENTITIOUS MATERIAL | 17 wt% | 16 wt% |
| STABILIZING MATERIAL WITH PHOSPHORUS-CONTAINING COMPOUND WT% IN CEMENTITIOUS MATERIAL (PHOSPHORIC ACID) | 0.1 wt% | 1 wt% |
| STABILIZING MATERIAL WITH PHOSPHORUS-CONTAINING COMPOUND WT% IN CEMENTITIOUS MATERIAL (PHOSPHOROUS ACID) | 0 wt% | 0 wt% |
| REINFORCING COMPONENT WT% IN TILE BACKER BOARD | 9 wt% Chopped Carbon Fibers | 9.1 wt% Chopped Hydrocarbon Fiber |
| AGGREGATE WT% IN TILE BACKER BOARD | 15 wt% Perlite | 15 wt% Perlite |
| BIOMASS WT% IN TILE BACKER BOARD | 0.1 wt% Rice Husks | 15 wt% Corn Husks |
| SURFACTANT WT% IN TILE BACKER BOARD | 0 wt% | 0 wt% |
| RE-DISPERSIBLE POLYMER POWDER WT% IN TILE BACKER BOARD | 0 wt% | 0 wt% |
| ACRYLIC WT% IN TILE BACKER BOARD | 0 wt% | 0 wt% |
| STYRENE BUTADIENE RUBBER (SBR) WT% IN TILE BACKER BOARD | 0 wt% | 0 wt% |
| *FINAL FORMULATION* | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 87 wt% | 80 wt% |
| AMORPHOUS PHASE CEMENTITIOUS MATERIAL AS DETERMINED BY X-RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 10 wt% | 17 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 2 wt% | 13 wt% |
| MAGNESIUM CRYSTAL CONTENT OF THE CEMENTITIOUS MATERIAL PERCENTAGE RETAINED | 2 wt% | 16% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQwin AUTOMATED SORPTION DATA ACQUISITION AND REDUCTION | 20 $m^2/g$ | 24 $m^2/g$ |
| PERCENT SURFACE AREA INCREASED | 2% | 23% |
| FLEXURAL STRENGTH | 9.5 | 9.2 |
| FLEXURAL STRENGTH AFTER 60C SOAK AT 24 HOURS | 7 | 7.6 |
| FLEXURAL STRENGTH RETAINED | 74% | 83% |

A) WOOD, PERLITE, STYRENE FOAM BEADS IN A 30:8:1 RATIO
B) VINYL ACETATE ETHYLENE

FIG. 3Q

TILE BACKER BOARD

| *STARTING MATERIAL* | Sample 17 | Sample 18 |
|---|---|---|
| MGO DRY POWDER WT% IN CEMENTITIOUS MATERIAL | 32.5 wt% | 33 wt% |
| MAGNESIUM CHLORIDE WT% DISSOLVED IN WATER IN CEMENTITIOUS MATERIAL | 17.5 wt% | 18 wt% |
| STABILIZING MATERIAL WITH PHOSPHORUS-CONTAINING COMPOUND WT% IN CEMENTITIOUS MATERIAL (PHOSPHORIC ACID) | 1.75 wt% | 2.5 wt% |
| STABILIZING MATERIAL WITH PHOSPHORUS-CONTAINING COMPOUND WT% IN CEMENTITIOUS MATERIAL (PHOSPHOROUS ACID) | 0 wt% | 0 wt% |
| REINFORCING COMPONENT WT% IN TILE BACKER BOARD | 9.2 wt% Chopped Silica-Containing Fibers | 9.3 wt% Hemp-containing Fibers and other Carbonaceous Materials |
| AGGREGATE WT% IN TILE BACKER BOARD | 15 wt% Styrene-based Foam Beads | 15 wt% Glass Particulate |
| BIOMASS WT% IN TILE BACKER BOARD | 0 wt% | 0 wt% |
| SURFACTANT WT% IN TILE BACKER BOARD | 0.1 wt% Detergent | 10 wt% Sodium Stearate |
| RE-DISPERSIBLE POLYMER POWDER WT% IN TILE BACKER BOARD | 0 wt% | 0 wt% |
| ACRYLIC WT% IN TILE BACKER BOARD | 0 wt% | 0 wt% |
| STYRENE BUTADIENE RUBBER (SBR) WT% IN TILE BACKER BOARD | 0 wt% | 0 wt% |
| *FINAL FORMULATION* | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 77 wt% | 74 wt% |
| AMORPHOUS PHASE CEMENTITIOUS MATERIAL AS DETERMINED BY X-RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 21 wt% | 24 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 35 wt% | 51 wt% |
| MAGNESIUM CRYSTAL CONTENT OF THE CEMENTITIOUS MATERIAL PERCENTAGE RETAINED | 46% | 69% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQwin AUTOMATED SORPTION DATA ACQUISITION AND REDUCTION | 27 $m^2/g$ | 29 $m^2/g$ |
| PERCENT SURFACE AREA INCREASED | 38% | 49% |
| FLEXURAL STRENGTH | 9 | 8.9 |
| FLEXURAL STRENGTH AFTER 60C SOAK AT 24 HOURS | 8 | 8 |
| FLEXURAL STRENGTH RETAINED | 89% | 90% |

A) WOOD, PERLITE, STYRENE FOAM BEADS IN A 30:8:1 RATIO

B) VINYL ACETATE ETHYLENE

FIG. 3R

TILE BACKER BOARD

| *STARTING MATERIAL* | Sample 19 | Sample 20 |
|---|---|---|
| MGO DRY POWDER WT% IN CEMENTITIOUS MATERIAL | 33 wt% | 32 wt% |
| MAGNESIUM CHLORIDE WT% DISSOLVED IN WATER IN CEMENTITIOUS MATERIAL | 19 wt% | 17 wt% |
| STABILIZING MATERIAL WITH PHOSPHORUS-CONTAINING COMPOUND WT% IN CEMENTITIOUS MATERIAL (PHOSPHORIC ACID) | 3.75 wt% | 5 wt% |
| STABILIZING MATERIAL WITH PHOSPHORUS-CONTAINING COMPOUND WT% IN CEMENTITIOUS MATERIAL (PHOSPHOROUS ACID) | 0 wt% | 0 wt% |
| REINFORCING COMPONENT WT% IN TILE BACKER BOARD | 9.5 wt% Chopped Hydrocarbon Fiber | 9.6 wt% Chopped Silica-Containing Fibers |
| AGGREGATE WT% IN TILE BACKER BOARD | 11 wt%[A] | 12 wt%[A] |
| BIOMASS WT% IN TILE BACKER BOARD | 0 wt% | 0 wt% |
| SURFACTANT WT% IN TILE BACKER BOARD | 0 wt% | 0 wt% |
| RE-DISPERSIBLE POLYMER POWDER WT% IN TILE BACKER BOARD | 0.1 wt% VAE[B] | 5 wt% VAE[B] |
| ACRYLIC WT% IN TILE BACKER BOARD | 0 wt% | 0 wt% |
| STYRENE BUTADIENE RUBBER (SBR) WT% IN TILE BACKER BOARD | 0 wt% | 0 wt% |
| *FINAL FORMULATION* | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 70 wt% | 67 wt% |
| AMORPHOUS PHASE CEMENTITIOUS MATERIAL AS DETERMINED BY X-RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 28 wt% | 31 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 51 wt% | 48 wt% |
| MAGNESIUM CRYSTAL CONTENT OF THE CEMENTITIOUS MATERIAL PERCENTAGE RETAINED | 73% | 72% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQwin AUTOMATED SORPTION DATA ACQUISITION AND REDUCTION | 29 $m^2/g$ | 28 $m^2/g$ |
| PERCENT SURFACE AREA INCREASED | 49% | 43% |
| FLEXURAL STRENGTH | 8.5 | 8.3 |
| FLEXURAL STRENGTH AFTER 60C SOAK AT 24 HOURS | 8.1 | 8.1 |
| FLEXURAL STRENGTH RETAINED | 95% | 98% |

A WOOD, PERLITE, STYRENE FOAM BEADS IN A 30:8:1 RATIO

B) VINYL ACETATE ETHYLENE

FIG. 3S

TILE BACKER BOARD

| *STARTING MATERIAL* | Sample 21 | Sample 22 |
|---|---|---|
| MGO DRY POWDER WT% IN CEMENTITIOUS MATERIAL | 35 wt% | 30 wt% |
| MAGNESIUM CHLORIDE WT% DISSOLVED IN WATER IN CEMENTITIOUS MATERIAL | 16 wt% | 18 wt% |
| STABILIZING MATERIAL WITH PHOSPHORUS-CONTAINING COMPOUND WT% IN CEMENTITIOUS MATERIAL (PHOSPHORIC ACID) | 6.25 wt% | 7.5 wt% |
| STABILIZING MATERIAL WITH PHOSPHORUS-CONTAINING COMPOUND WT% IN CEMENTITIOUS MATERIAL (PHOSPHOROUS ACID) | 0 wt% | 0 wt% |
| REINFORCING COMPONENT WT% IN TILE BACKER BOARD | 9.7 wt% Chopped Carbon Fibers | 9.8 wt% Chopped Hydrocarbon Fiber |
| AGGREGATE WT% IN TILE BACKER BOARD | 13 wt%[A] | 14 wt%[A] |
| BIOMASS WT% IN TILE BACKER BOARD | 0 wt% | 0 wt% |
| SURFACTANT WT% IN TILE BACKER BOARD | 0 wt% | 0 wt% |
| RE-DISPERSIBLE POLYMER POWDER WT% IN TILE BACKER BOARD | 0 wt% | 0 wt% |
| ACRYLIC WT% IN TILE BACKER BOARD | 0.1 wt% Acrylic | 5 wt% Acrylic |
| STYRENE BUTADIENE RUBBER (SBR) WT% IN TILE BACKER BOARD | 0 wt% | 0 wt% |
| *FINAL FORMULATION* | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 64 wt% | 61 wt% |
| AMORPHOUS PHASE CEMENTITIOUS MATERIAL AS DETERMINED BY X-RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 34 wt% | 37 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 47 wt% | 43 wt% |
| MAGNESIUM CRYSTAL CONTENT OF THE CEMENTITIOUS MATERIAL PERCENTAGE RETAINED | 73% | 70% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQwin AUTOMATED SORPTION DATA ACQUISITION AND REDUCTION | 24 $m^2/g$ | 27 $m^2/g$ |
| PERCENT SURFACE AREA INCREASED | 23% | 38% |
| FLEXURAL STRENGTH | 8 | 7.6 |
| FLEXURAL STRENGTH AFTER 60C SOAK AT 24 HOURS | 7.7 | 7.2 |
| FLEXURAL STRENGTH RETAINED | 96% | 95% |

A WOOD, PERLITE, STYRENE FOAM BEADS IN A 30:8:1 RATIO

B) VINYL ACETATE ETHYLENE

FIG. 3T

TILE BACKER BOARD

| *STARTING MATERIAL* | Sample 23 | Sample 24 |
|---|---|---|
| MGO DRY POWDER WT% IN CEMENTITIOUS MATERIAL | 33 wt% | 32 wt% |
| MAGNESIUM CHLORIDE WT% DISSOLVED IN WATER IN CEMENTITIOUS MATERIAL | 15 wt% | 19 wt% |
| STABILIZING MATERIAL WITH PHOSPHORUS-CONTAINING COMPOUND WT% IN CEMENTITIOUS MATERIAL (PHOSPHORIC ACID) | 8.75 wt% | 10 wt% |
| STABILIZING MATERIAL WITH PHOSPHORUS-CONTAINING COMPOUND WT% IN CEMENTITIOUS MATERIAL (PHOSPHOROUS ACID) | 0 wt% | 0 wt% |
| REINFORCING COMPONENT WT% IN TILE BACKER BOARD | 9.9 wt% Chopped Hydrocarbon Fiber | 10 wt% Chopped Silica-Containing Fibers |
| AGGREGATE WT% IN TILE BACKER BOARD | 16 wt%[A] | 17 wt%[A] |
| BIOMASS WT% IN TILE BACKER BOARD | 0 wt% | 0 wt% |
| SURFACTANT WT% IN TILE BACKER BOARD | 0 wt% | 0 wt% |
| RE-DISPERSIBLE POLYMER POWDER WT% IN TILE BACKER BOARD | 0 wt% | 0 wt% |
| ACRYLIC WT% IN TILE BACKER BOARD | 0 wt% | 0 wt% |
| STYRENE BUTADIENE RUBBER (SBR) WT% IN TILE BACKER BOARD | 0.1 wt% SBR | 5 wt% SBR |
| *FINAL FORMULATION* | | |
| MAGNESIUM CRYSTAL CONTENT OF THE CEMENTITIOUS MATERIAL AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 57 wt% | 50 wt% |
| AMORPHOUS PHASE CEMENTITIOUS MATERIAL AS DETERMINED BY X-RAY DIFFRACTIONBY QUANTITIATIVE X-RAY DIFFRACTION ON A RIGAKU IV ULTIMA AND ANALYZED USING THE SOFTWARE MATERIALS ANALYSIS USING DIFFRACTION | 41 wt% | 48 wt% |
| MAGNESIUM CRYSTAL CONTENT OF THE CEMENTITIOUS MATERIAL AFTER 24 HOUR SOAK IN 60C WATER AS DETERMINED BY QUANTITIATIVE X-RAY DIFFRACTION ON A RIGAKU IV ULTIMA AND ANALYZED USING THE SOFTWARE MATERIALS ANALYSIS USING DIFFRACTION | 41 wt% | 45 wt% |
| MAGNESIUM CRYSTAL CONTENT OF THE CEMENTITIOUS MATERIAL PERCENTAGE RETAINED | 72% | 90% |
| SURFACE AREA OF THE CEMENTITIOUS MATERIAL AS DETERMINED USING NITROGEN ABSORPTION AND CALCULATED USING THE BRUNAUER–EMMETT–TELLER (BET) THEORY WITH QUANTACHROME ASIQwin AUTOMATED SORPTION DATA ACQUISITION AND REDUCTION | 29 $m^2/g$ | 29 $m^2/g$ |
| PERCENT SURFACE AREA INCREASED | 49% | 49% |
| FLEXURAL STRENGTH | 7.5 | 7.2 |
| FLEXURAL STRENGTH AFTER 60C SOAK AT 24 HOURS | 7.1 | 6.7 |
| FLEXURAL STRENGTH RETAINED | 95% | 93% |

A WOOD, PERLITE, STYRENE FOAM BEADS IN A 30:8:1 RATIO

B) VINYL ACETATE ETHYLENE

FIG. 4

| $H_3PO_4$ added | MgO powder purity | MgO Source | $MgCl_2$ Brine concentration | $MgO/MgCl_2$ weight ratio | Aggregate Percentage | Magnesium oxychloride crystal content | MOC crystal content after 24 hour soak in 60C water |
|---|---|---|---|---|---|---|---|
| wt% | wt% | | wt% | | wt% | wt% | wt% |
| 0 | 98 | U.S. | 28 | 2:1 | 16 | 67 | 4 |
| 1.25 | 98 | U.S. | 28 | 2:1 | 16 | 53 | 25 |
| 2.5 | 98 | U.S. | 28 | 2:1 | 16 | 46 | 35 |
| 0 | 85 | China | 28 | 2:1 | 15 | 57 | 2 |
| 1.5 | 85 | China | 28 | 2:1 | 15 | 44 | 25 |
| 3 | 85 | China | 28 | 2:1 | 15 | 44 | 40 |

ULTRA STABLE CEMENTITIOUS MATERIAL FORMULATION, PROCESS FOR ITS MAKING, AND ULTRA STABLE TILE BACKER BOARD FORMULATION AND PROCESSES FOR ITS MAKING

CROSS REFERENCE TO RELATED APPLICATIONS

This application is a Continuation of U.S. Nonprovisional patent application Ser. No. 16/235,444, filed Dec. 28, 2018, which is a Continuation of U.S. Nonprovisional patent application Ser. No. 16/006,583, filed Jun. 12, 2018; Ser. No. 16/006,598, filed Jun. 12, 2018; Ser. No. 16/006,554, filed Jun. 12, 2018; and Ser. No. 16/006,570, filed Jun. 12, 2018, each of which claims priority to and the benefit of U.S. Provisional Patent Application Ser. No. 62/582,517, filed on Nov. 7, 2017, and U.S. Provisional Patent Application Ser. No. 62/582,545 filed on Nov. 7, 2017. These applications are incorporated by reference herein in their entirety for all relevant purposes.

FIELD

The present invention generally relates to a formulation for making an ultra-stable cementitious material, a process for its making, an ultra-stable tile backer board formulation, and a process for making the tile backer board.

BACKGROUND

A need exists for a crystalline silica-free construction material with structural integrity, fire-resistance, excellent insulation properties and superior resistance to mold, mildew, and termites.

A further need exists for a construction material with high hot water stability.

The present embodiments meet these needs.

BRIEF DESCRIPTION OF THE DRAWINGS

The detailed description will be better understood in conjunction with the accompanying drawings as follows:

FIGS. 1A-1D depict the stepwise process for making the ultra-stable cementitious material and tile backer board of the present invention.

FIGS. 3A-3H depict tables of cementitious material formulations of the present invention containing reinforcing components and aggregate and other additives along with physical properties of the formulations.

FIGS. 3I-3T depict tables of tile backer boards of the present invention containing reinforcing components and aggregate and other additives along with physical properties of the formulations.

FIG. 4 is a table showing various additional formulations made according to the process of the present invention.

Figure 2:
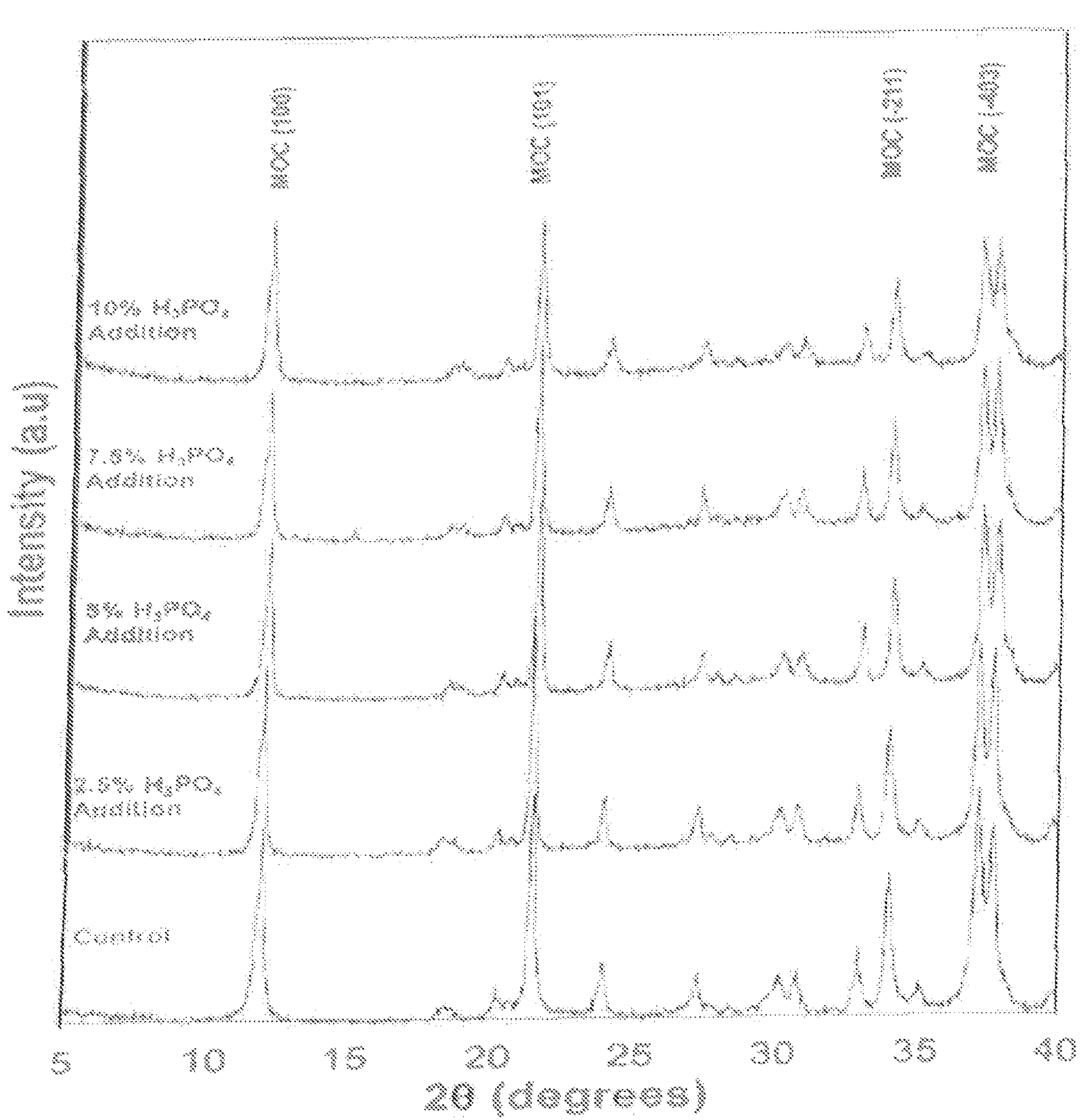
FIG. 2 depicts the X-ray diffraction pre-treatment and post-treatment of magnesium oxychloride with phosphoric acid.

The present embodiments are detailed below with reference to the listed Figures.

DETAILED DESCRIPTION OF THE EMBODIMENTS

Before explaining the present process in detail, it is to be understood that the formulation and process of the present invention are not limited to the particular embodiments and that they can be practiced or carried out in various ways.

The invention relates to a process for making an ultra-stable cementitious construction material consisting of a crystallized portion with an amorphous nano-molecular veneer substantially free of crystalline silica.

The first step of the process involves forming a gel phase by blending together magnesium oxide and magnesium chloride in a water with a weight ratio of from 1.9:1 to 2.1:1 of magnesium oxide to magnesium chloride.

In the process, from 2 weight percent to 30 weight percent of aggregate is added to the gel phase, forming an amorphous phase.

Phosphorous acid or phosphoric acid or both are then added to the amorphous phase, actuating crystallization of a portion of the amorphous phase, while simultaneously forming a nano-molecular veneer encapsulating the crystallized portion of the amorphous phase without detectable magnesium phosphate and with from 2% to 49% (e.g., 35% to 49%) increase in surface area as compared to veneer-free crystallized portions, and wherein the crystallized portion with nano-molecular veneer is configured to resist degradation in water having a temperature at 60 degrees C. for 48 hours.

Benefits of the process are as follows: increased cement stability when submerged in water at temperatures up to 60 degrees C.; a physical property that determines warm water stability for the above cement and no additional time required for this invention.

Benefits of the cementitious material formulation include increased cement stability when submerged in water at temperatures up to 60 degrees C.

The invention provides magnesium oxychloride cement that has increased stability in environments with high temperatures and high moisture.

The invention provides a cementitious material with a protective layer that is not an exposed crystal, so it is not susceptible to moisture or water dissolving at elevated temperatures.

The invention stabilizes the concrete thereby reducing the corrosion effects on other building materials in the assembly.

This invention has an improved water tolerance over other types of magnesium oxychloride cements without adding polymers or other sealants that can sacrifice some of the excellent fire-resistant properties of magnesium oxychloride cements.

The inventive and unexpected amorphous layer that protects the magnesium oxychloride cement crystals is less detrimental to the structural strength of the cement product than other uses of phosphoric compounds have proven to be.

The invention relates to a process for making a cementitious construction material consisting of a crystallized portion with an amorphous nano-molecular veneer substantially free of crystalline silica.

The first step of the process involves forming a gel phase by blending together magnesium oxide and magnesium chloride in a water with a weight ratio of from 1.9:1 to 2.1:1 of magnesium oxide to magnesium chloride.

In the process, from 2 weight percent to 30 weight percent of aggregate is added to the gel phase, forming an amorphous phase.

Phosphorous acid or phosphoric acid or both are then added to the amorphous phase, actuating crystallization of a portion of the amorphous phase, while simultaneously forming a nano-molecular veneer encapsulating the crystallized portion of the amorphous phase without detectable magnesium phosphate and with from 2% to 49% increase in surface area as compared to veneer-free crystallized portions, and wherein the crystallized portion with nano-molecular veneer is configured to resist degradation in water having a temperature at 60 degrees C. for 48 hours.

Benefits of the process are as follows: increased cement stability when submerged in water at temperatures up to 60 degrees C., a physical property that determines warm water stability for the above cement, and no additional time required for this invention.

The invention relates to a process to make an ulstrastable cementitious material with nano-molecular veneer and an ultrastable cementitious material with nano-molecular veneer.

The invention further relates to the formulation of a tile backer board consisting of a crystallized portion with an amorphous nano-molecular veneer substantially free of crystalline silica.

Benefits of the tile backer board formulation include increased cement stability when submerged in water at temperatures up to 60 degrees C.

The invention provides a tile backer board with a protective layer that is not an exposed crystal, so it is not susceptible to moisture or water dissolving at elevated temperatures.

The Following Definitions are Used Herein:

The term “aggregate” refers to a wood, perlite, foam beads, glass, calcium carbonate powder, or carbon fiber strands with a particle size no larger than 3 mm.

The term “amorphous phase” refers to a non-crystalline mixture of the final reacted products.

The term “amorphous nano-molecular veneer” refers to a coating bonded to the crystallized portion that has a material which is not visible as crystalline in an X-ray diffraction test, and has a density of molecules which is inert to water molecules.

The term “biomass” refers to organic materials such as wood flour, straw, ground pecan shells, and ground up bagasse.

The term “cementitious construction material” refers to a board or structure that is used for structural assembly to form facilities, offices, barns, homes, fences, and marine quarters for use on a ship or oil platform offshore.

The term “crystallized portion” refers to a segment of the created cementitious construction material with activation energies of 70 kilojoules per mole, having a monoclinic crystalline structure which in this invention includes magnesium oxychloride.

The term “crystalline silica” refers to silica molecules, such as sand, in a crystalline phase, similar to glass.

The term “dispersible polymer” is a water dispersible ethylene-vinyl acetate copolymer.

The term “encapsulating” refers to the creation of a nano-molecular veneer over surfaces of the crystals wherein the surface coating can be connected, such as sandpaper which comprises many silica particles adhered to a substrate with very little space between the silica particles. The dendritic nature of the plurality of crystals provide a coating that may be continuous or have small gaps.

The term “fibers” refers to needle-like materials that do not exceed 3 mm in length, but could include longer fibers woven into a mat.

The term “gel phase” refers to a phase in which molecules attract to each other without bonding in a slurry.

The term “insoluble in water” refers to a compound that will not go into solution or degrade when exposed to water between ambient temperature and 60 degrees C. for 0 hours to 48 hours.

The term “magnesium chloride in a water” refers to a liquid containing anhydrous magnesium chloride salt such as a water containing an anhydrous magnesium chloride salt with from 20 to 35 weight percent salt in the water which can be distilled water, dirty water containing particulates and non-volatile organic matter, or clean tap water.

The term “magnesium oxide” refers to the powder form of MgO with from 80% to 98% purity, the balance being calcium carbonate, quartz, or iron oxide or similar impurities naturally found in magnesite.

The term “magnesium phosphate crystals” refers to the crystals formed by the reaction of magnesium oxide with phosphoric acid or phosphorous acid.

The term “nano-molecular elements” refers to the newly identified, insoluble in water, non-crystalline, phosphorous-containing species; identifiable with scan electron microscope (SEM) with elemental analysis. This material will not show up as a phosphorous containing species on XRAY DIFFRACTION.

The term “phosphoric acid” refers to a concentrate of $H_3PO_4$ with a density of 1.1 g/ml to 1.85 g/ml.

The term “phosphorous acid” refers a concentrate of $H_3PO_3$ with a density of 1.1 g/ml to 1.65 g/ml.

The term “plurality of crystals” refers to the magnesium oxychloride crystals which form from part of the amorphous phase.

The term “predetermined temperature for the water” refers to a temperature from ambient temperature to 90 degrees C.”.

The term “preset period of time” refers to a window of time from 10 hours to 90 hours, and specifically includes from 24 hours to 72 hours.

The phrase “protects the plurality of crystals from degradation in water” refers to the nano-molecular veneer making the strength loss lower than it would be without the nano-molecular veneer when the cementitious material is exposed to water between ambient temperature and 60 degrees C. for 0-48 hours.

The term “substantially free” refers to a less than 3 weight percent content of crystalline silica based on x-ray diffraction testing in the cementitious construction material.

The term “surface area” refers to the surface area as tested using the BET theory methodology.

The term “veneer” refers to a chemically bonded protective layer on the crystallized portion of the amorphous phase configured to resist water which can be elevated to 60 degrees C. for extended periods of time.

The term “water” refers to $H_2O$ with impurities of less than 0.5 weight percent.

Process for Making Ultra-Stable Cementitious Material

A process to make an ultrastable cementitious material with nano-veneer involves blending 29 wt % to 40 wt % of a magnesium oxide dry powder containing 80 wt % to 98 wt % of magnesium oxide based on a final total weight of the cementitious material, with 14 wt % to 18 wt % of a magnesium chloride dissolved in water based on a final total weight of the cementitious material.

The magnesium oxide has a surface area ranging from 5 meters$^2$/gram to 50 meters$^2$/gram and an average particle size ranging from about 0.3 to about 90 microns wherein more than about 90% by weight magnesium oxide particles are less than or equal to about 40 microns.

The magnesium chloride is in an aqueous solution. The magnesium chloride can be a 20 wt % to 30 wt % a magnesium chloride aqueous solution.

The magnesium oxide and the magnesium chloride in water, react to form a liquid suspension.

The process involves mixing the liquid suspension for from 2 minutes to 10 minutes while minimizing adding gas into the liquid suspension.

The process involves adding 0.1 wt % to 10 wt % of a stabilizing material with a phosphorus-containing compound based on a final total weight of the cementitious material to the mixed liquid suspension.

The stabilizing material with the phosphorus-containing compound can be a phosphorous acid (A) based on the final total weight of the cementitious material, wherein the phosphorous acid consists of an aqueous solution of 55 wt % to 65 wt % of a concentrate of $H_3PO_3$; or a phosphoric acid (B) based on the final total weight of the cementitious material, wherein the phosphoric acid consists of an aqueous solution of 80 wt % to 90 wt % of a concentrate of $H_3PO_4$.

The next step of the process allowing the liquid suspension with stabilizing material to react into an amorphous phase cementitious material for a period of time from 1 minute to 4 minutes.

A portion of the amorphous phase cementitious material grows a plurality of crystals, each crystal having a MW within the range of 280 to 709, the amorphous phase cementitious material encapsulating the plurality of crystals, wherein a majority of stabilizing material with a phosphorus-containing compound are consumed into a nano-molecular veneer while increasing surface area of the plurality of crystals by 2% to 49% during curing, and wherein the nano-molecular elements of the cured nano-molecular veneer are insoluble in water and the cured nano-molecular veneer protects the plurality of crystals from degradation in water at temperatures from 20 degrees to 60 degrees Celsius for from 24 hours to 56 days of the formed cementitious material.

In an embodiment, the process involves blending 35 wt % to 79.9 wt % of the formed cementitious material with 0.1 wt % to 30 wt % of an aggregate based on a final total weight of the concrete, the aggregate comprising particles, having a diameter from 1 nm to 10 mm, wherein the aggregate comprises at least one of: wood, perlite, styrene based foam beads, calcium carbonate powder, glass particulate, and combinations thereof.

In an embodiment, the process involves pouring the concrete over 0.1 wt % to 2 wt % of a reinforcing material based on a final total weight of the cementitious material that cures into the cementitious material, the reinforcing material comprising a non-woven or woven silica containing mat, a non-woven or woven hydrocarbon containing mat.

In an embodiment, the process involves adding 0.1 weight percent to 15 weight percent biomass added to the amorphous phase cementitious material based on the final total weight of the concrete and mixing from 3 to 10 minutes.

The biomass can be a member of the group: rice husks, corn husks, and dung.

In an embodiment, the process involves adding 0.1 wt % to 10 wt % of at least one surfactant to the cementitious material based on the final total weight of the concrete to decrease porosity of aggregate and prevent amorphous phase cementitious material from entering pores of the aggregate.

The surfactant can be a detergent.

In an embodiment, the process involves adding 0.1 weight percent to 5 weight percent of a re-dispersible powder polymer based on the final total weight of the concrete and mixing from 3 to 10 minutes.

In an embodiment, the re-dispersible powder polymer can be selected from the group consisting of silicon, polyurethane dispersion, polyurethane, alkyl carboxylic acid vinyl ester monomer, branched and unbranched alcohol(meth) acrylic acid ester monomer, vinyl aromatic monomer, olefin monomer, diene monomer and vinyl halide monomer or a vinyl acetate ethylene "VAE".

In an embodiment, the process involves adding 0.1 weight percent to 5 weight percent based on the final total weight of the cementitious material of an acrylic or styrene butadiene rubber (SBR) into the concrete while the re-dispersible powder polymer is added.

In an embodiment, the process involves adding 0.1 wt % to 15 wt % of a reinforcing material based on the final total weight of the concrete.

The reinforcing material can be at least one of: a chopped silica containing fibers; hemp containing fibers; nano-molecular carbon fiber strands; chopped carbon fibers; chopped hydrocarbon fiber; and combinations thereof;

Ultra-Stable Cementitious Material

The ultrastable cementitious material contains 29 wt % to 40 wt % of a magnesium oxide dry powder containing 80 wt % to 98 wt % of magnesium oxide based on a final total weight of the cementitious material, the magnesium oxide with a surface area ranging from 5 meters$^2$/gram to 50 meters$^2$/gram and an average particle size ranging from about 0.3 to about 90 microns wherein more than about 90% by weight magnesium oxide particles are less than or equal to about 40 microns.

The ultrastable cementitious material contains 14 wt % to 18 wt % of a magnesium chloride dissolved in water based on a final total weight of the cementitious material.

The ultrastable cementitious material contains 0.1 wt % to 10 wt % of a stabilizing material with a phosphorus-containing compound based on a final total weight of the cementitious material.

The stabilizing material with the phosphorus-containing compound has a phosphorous acid (A) based on the final total weight of the cementitious material, wherein the phosphorous acid consists of an aqueous solution of 55 wt % to 65 wt % of a concentrate of $H_3PO_3$; or a phosphoric acid (B) based on the final total weight of the cementitious material, wherein the phosphoric acid consists of an aqueous solution of 80 wt % to 90 wt % of a concentrate of $H_3PO_4$.

A portion of the amorphous phase cementitious material grows a plurality of crystals, each crystal having a MW within the range of 280 to 709, the amorphous phase cementitious material encapsulating the plurality of crystals, wherein a majority of stabilizing material with a phosphorus-containing compound are consumed into a nano-molecular veneer while increasing surface area of the plurality of crystals by 2% to 49% during curing, and wherein the nano-molecular elements of the cured nano-molecular veneer are insoluble in water and the cured nano-molecular veneer protects the plurality of crystals from degradation in water at temperatures from 20 degrees to 60 degrees Celsius for from 24 hours to 56 days of the formed cementitious material.

In an embodiment, ultra-stable cementitious material with nano-molecular veneer includes: 0.1 wt % to 30 wt % of an aggregate based on a final total weight of the concrete, the aggregate comprising particles, having a diameter from 1 nm to 10 mm, wherein the aggregate comprises at least one of: wood, perlite, styrene based foam beads, calcium carbonate powder, glass particulate, and combinations thereof.

In an embodiment, ultra-stable cementitious material with nano-molecular veneer includes: 0.1 wt % to 2 wt % of a reinforcing material based on a final total weight of the cementitious material, the reinforcing material comprising a non-woven or woven silica containing mat, a non-woven or woven hydrocarbon containing mat.

In an embodiment, ultra-stable cementitious material with nano-molecular veneer includes: 0.1 weight percent to 15 weight percent biomass added to the amorphous phase cementitious material based on the final total weight of the concrete.

The biomass can be a member of the group comprising: rice husks, corn husks, and dung.

In an embodiment, ultra-stable cementitious material with nano-molecular veneer includes: 0.1 wt % to 10 wt % of at least one surfactant to the cementitious material based on the final total weight of the concrete to decrease porosity of aggregate and prevent amorphous phase cementitious material from entering pores of the aggregate.

The surfactant can be a detergent.

In an embodiment, ultra-stable cementitious material with nano-molecular veneer includes: 0.1 weight percent to 5 weight percent of a re-dispersible powder polymer based on the final total weight of the concrete.

The re-dispersible powder polymer is selected from the group consisting of silicon, polyurethane dispersion, polyurethane, alkyl carboxylic acid vinyl ester monomer, branched and unbranched alcohol(meth)acrylic acid ester monomer, vinyl aromatic monomer, olefin monomer, diene monomer and vinyl halide monomer or a vinyl acetate ethylene "VAE".

In an embodiment, ultra-stable cementitious material with nano-molecular veneer includes: 0.1 weight percent to 5 weight percent based on the final total weight of the cementitious material of an acrylic or styrene butadiene rubber (SBR) into the concrete while the re-dispersible powder polymer is added.

In an embodiment, ultra-stable cementitious material with nano-molecular veneer includes: 0.1 wt % to 15 wt % of a reinforcing material based on the final total weight of the concrete.

The reinforcing material comprising at least one of: chopped silica containing fibers; hemp containing fibers; nano-molecular carbon fiber strands; chopped carbon fibers; chopped hydrocarbon fiber; and combinations thereof.

The aggregate includes particles based on a final total weight of the cementitious material, having a diameter from 1 nm to 10 mm.

The aggregate contains at least one of: wood, perlite, styrene based foam beads, calcium carbonate powder, glass particulate, and combinations thereof.

The cementitious material with aggregate is blended to the amorphous phase with from 0.1 wt % to 2 wt % of a reinforcing material based on a final total weight of the cementitious material.

The reinforcing material can be a non-woven or woven silica containing mat, a non-woven, or woven hydrocarbon containing mat.

In other embodiments, the reinforcing material can be chopped silica containing fibers; hemp containing fibers; nano-molecular carbon fiber strands; chopped carbon fibers; chopped hydrocarbon fiber; and combinations thereof.

The amorphous phase cementitious material containing aggregate can be poured over the reinforcing material enabling a portion of the amorphous phase cementitious material to grow a plurality of crystals, each crystal having a MW within the range of 280 to 709, the amorphous phase cementitious material encapsulating the plurality of crystals.

A majority of stabilizing material with a phosphorus-containing compound can be consumed into a nano-molecular veneer while increasing surface area of the plurality of crystals by 2% to 49% during curing, and wherein the nano-molecular elements of the cured nano-molecular veneer are insoluble in water and the cured nano-molecular veneer protects the plurality of crystals from degradation in water at temperatures from 20 degrees to 60 degrees Celsius for from 24 hours to 56 days of the formed cementitious material.

In embodiments of the cementitious material, 0.1 weight percent to 15 weight percent biomass can be added to the amorphous phase cementitious material based on the final total weight of the cementitious material.

In embodiments of the cementitious material, 0.1 wt % to 10 wt % of at least one surfactant is added to the cementitious material based on the final total weight of the cementitious material to decrease porosity of aggregate and prevent amorphous phase cementitious material from entering pores of the aggregate.

In embodiments of the cementitious material, 0.1 weight percent to 5 weight percent of a re-dispersible powder polymer based on the final total weight of the cementitious material can be incorporated in the amorphous phase cementitious material.

In embodiments of the cementitious material, the re-dispersible powder polymer can be selected from the group consisting of acrylic, silicon, polyurethane dispersion, polyurethane, alkyl carboxylic acid vinyl ester monomer, branched and unbranched alcohol(meth)acrylic acid ester monomer, vinyl aromatic monomer, olefin monomer, diene monomer and vinyl halide monomer.

In embodiments of the cementitious material, 0.1 weight percent to 5 weight percent based on the final total weight of the cementitious material of an acrylic or styrene butadiene rubber (SBR) can be blended into the amorphous cementitious material with the re-dispersible powder polymer.

In embodiments of the cementitious material, 0.1 weight percent to 5 weight percent based on the final total weight of the cementitious material of a re-dispersible polymer powder can be added to the amorphous cementitious material, wherein the re-dispersible polymer powder is a member of the group consisting of: a vinyl ethylene ester and ethylene, a vinyl laurate vinyl chloride copolymer, a vinyl ester monomers, (meth)acrylate monomer, a vinyl aromatic monomer, an olefin monomer, a 1,3-diene monomer, a vinyl halide monomer, a homopolymer or copolymer derived from one or more monomers selected from the group consisting of a vinyl acetate, a vinyl ester of an alpha-branched monocarboxylic acids having from 9 to 11 carbon atoms, a vinyl chloride, an ethylene, a methyl acrylate, a methyl methacrylate, an ethyl acrylate, an ethyl methacrylate, a propyl acrylate, a propyl methacrylate, an n-butyl acrylate, a n-butyl methacrylate, an 2-ethylhexyl acrylate.

The invention relates to a building with an exterior building surface covered with the cementitious material of the formulations of the independent claims of this application.

Figure 1A:
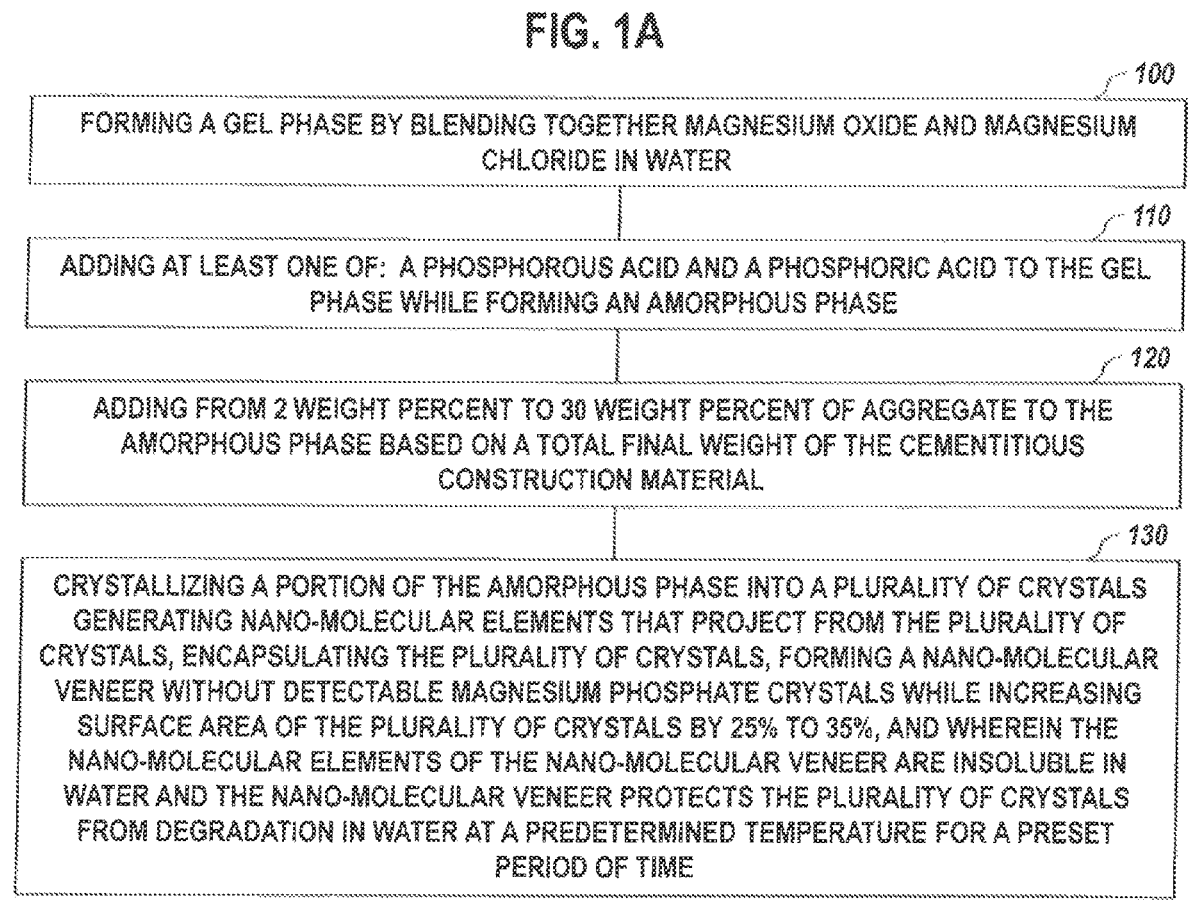

FIG. 1A shows the steps of the invention.

The process for making a cementitious construction material as step 100: forming a gel phase by blending together magnesium oxide and magnesium chloride in water.

Step 110 can involve adding at least one of: a phosphorous acid and a phosphoric acid to the gel phase while forming an amorphous phase.

Step 120 can require adding from 2 weight percent to 30 weight percent of aggregate to the amorphous phase based on a total final weight of the cementitious construction material.

Step 130 can involve crystallizing a portion of the amorphous phase into a plurality of crystals generating nano-molecular elements that project from the plurality of crystals, encapsulating the plurality of crystals, forming a nano-molecular veneer without detectable magnesium phosphate crystals while increasing surface area of the plurality of crystals by 2% to 49%, and wherein the nano-molecular elements of the nano-molecular veneer are insoluble in water and the nano-molecular veneer protects the plurality of crystals from degradation in water at a predetermined temperature for a preset period of time.

In embodiments, the process for making a cementitious construction material can include adding from 0.1 weight percent to 15 weight percent biomass to the gel phase based on the total final weight of the cementitious construction material.

In embodiments, the process for making a cementitious construction material can involve adding from 0.1 weight percent to 5 weight percent of a dispersible polymer to the gel phase based on the total final weight of the cementitious construction material.

FIG. 1B depicts the steps needed to make the tile backer board.

Step 200 can include forming from 35 wt % to 79.9 wt % of a cementitious material based on the final total weight of the tile backer board.

Step 201 can involve blending from 29 wt % to 40 wt % of a magnesium oxide dry powder containing 80 wt % to 98 wt % of magnesium oxide based on a final total weight of the cementitious material into 14 wt % to 18 wt % of a magnesium chloride dissolved in water based on a final total weight of the cementitious material.

Step 202 can involve mixing with a planetary mixer, the magnesium oxide and the magnesium chloride in water forming a liquid suspension while minimizing adding gas into the liquid suspension.

Step 204 can involve adding from 0.1 wt % to 10 wt % of a stabilizing material with a phosphorus-containing compound based on a final total weight of the cementitious material to the mixed liquid suspension.

Step 206 can involve reacting during a preset unit of time, the mixed liquid suspension into an amorphous phase cementitious material.

Step 208 can involve blending to the amorphous phase cementitious material from 0.1 wt % to 30 wt % of an aggregate comprising particles based on a final total weight of the tile backer board, having a diameter from 1 nm to 10 mm, wherein the aggregate comprises at least one of: wood, perlite, styrene based foam beads, calcium carbonate powder, glass particulate, and combinations thereof.

Step 210 can involve pouring the flowable concrete over from 0.1 wt % to 2 wt % of a reinforcing material based on a final total weight of the tile backer board forming a reinforced concrete.

Step 212 can involve forming during a preset unit of time, in a portion of the amorphous phase cementitious material a plurality of crystals of a defined Molecular Weight from the amorphous non-crystalline nano-molecular cementitious material encapsulating the plurality of crystals, creating a nano-molecular veneer without detectable phosphorus-containing compound while increasing surface area of the plurality of crystals.

Step 214 can include testing the formed tile backer board for stability in water at 60 degrees Celsius for 24 hours using the Jet Products, LLC Warm Water Stability Test as authenticated by Clemson University Chemical Engineering Department in 2017.

Figure 1C:
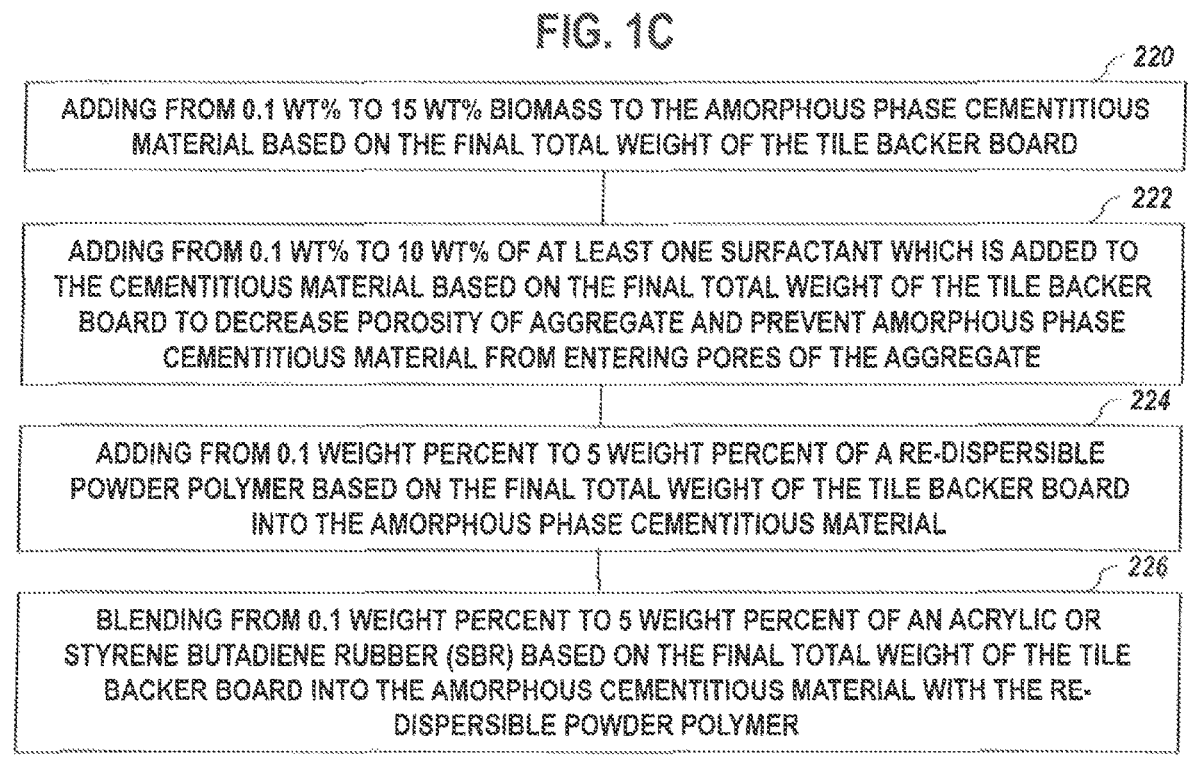

FIG. 1C depicts additional steps to be used with the embodiment of FIG. 1A to make the cementitious material.

FIG. 1C depicts:

Step 220 can include adding from 0.1 wt % to 15 wt % biomass to the amorphous phase cementitious material based on the final total weight of the tile backer board.

Step 222 can include adding from 0.1 wt % to 10 wt % of at least one surfactant which is added to the cementitious material based on the final total weight of the tile backer board to decrease porosity of aggregate and prevent amorphous phase cementitious material from entering pores of the aggregate.

Step 224 can include adding from 0.1 weight percent to 5 weight percent of a re-dispersible powder polymer based on the final total weight of the tile backer board into the amorphous phase cementitious material.

Step 226 can include blending from 0.1 weight percent to 5 weight percent of an acrylic or styrene butadiene rubber (SBR) based on the final total weight of the tile backer board into the amorphous cementitious material with the re-dispersible powder polymer.

FIG. 1D shows steps of another embodiment to make the cementitious material.

Step 250 can include forming from 55 wt % to 99.8 wt % of a cementitious material based on the final total weight of the tile backer board.

Step 252 can include forming from 55 wt % to 99.8 wt % of a cementitious material by blending 29 wt % to 40 wt % of a magnesium oxide dry powder containing from 80 wt % to 98 wt % of magnesium oxide based on a final total weight of the based on the cementitious material with from 14 wt % of 18 wt % of a magnesium chloride dissolved in water based on based on the final total weight of the cementitious material, to form a liquid suspension.

Step 254 can involve adding from 0.1 wt % to 10 wt % of a stabilizing material with a phosphorus-containing compound based on a final total weight of the cementitious material to the liquid suspension.

Step 256 can include allowing the liquid suspension to react into an amorphous phase cementitious material during a preset period of time.

Step 258 can involve adding from 0.1 wt % to 30 wt % of an aggregate based on the total weight of the tile backer board to the amorphous phase cementitious material.

Step 260 can involve adding from 0.1 wt % to 15 wt % of a reinforcing material based on the final total weight of the tile backer board, to the amorphous phase cementitious material, wherein the reinforcing material is at least one of: chopped silica containing fibers; hemp containing fibers; nano-molecular carbon fiber strands; chopped carbon fibers; chopped hydrocarbon fiber; and combinations thereof.

Step 262 can involve growing a portion of the amorphous phase cementitious material grows a plurality of crystals, each crystal having a MW within the range of 283 to 709, the amorphous phase cementitious material encapsulating the plurality of crystals, wherein a majority of stabilizing material with a phosphorus-containing compound are consumed into a nano-molecular veneer while increasing surface area of the plurality of crystals by 2% to 49% during curing, and wherein the nano-molecular elements of the cured nano-molecular veneer are insoluble in water and the cured nano-molecular veneer protects the plurality of crystals from degradation in water at temperatures from 20 degrees to 60 degrees Celsius for from 24 hours to 56 days of the formed tile backer board.

In embodiments, the cementitious construction material can create a nano-molecular veneer with a thickness from 1 micron to 3 microns.

In embodiments, the cementitious construction material can be used to create a cementitious construction material configured to support a load of at least 2.5 pounds per square foot.

In embodiments, the cementitious construction material produces product can be used to create a home, an office, a warehouse, a shed, a dock, artwork, aqueducts, or another load supporting structure.

In embodiments, the water can be a brine or similar salt solution with a concentration of 2% to 30% salt.

In embodiments, the cementitious construction material can contain fibers.

In variations of the cementitious construction material, prior to crystallizing the amorphous phase, an additional substrate can be introduced and coated with the cementitious construction material having oriented strand board, plywood, waterproof membrane, concrete, and wood, and coated with the amorphous phase increasing fire resistance and stability in hot water.

The cementitious construction material can include least one surfactant added to the amorphous phase to decrease porosity of aggregates and prevent amorphous phase from entering pores of the aggregates.

The surfactants can be any molecule that reduces the surface porosity of the aggregates being used in the cement.

In embodiments, the amorphous phase can be crystallized using a temperature from 40 to 50 degrees C. for a period of time from 3 to 24 hours, at a relative humidity from 30 to 100 percent.

In embodiments, the cementitious construction material can be formed using an exothermic reaction, such as generating 10 to 15 degrees of heat for the duration of the reaction.

In embodiments, the cementitious construction material gel phase can be formed using intimate mixing for at least 3 minutes prior to adding aggregate.

FIG. 2 shows diffractograms of cured samples produced from X-ray diffraction at 28 degrees C. The major 5 phase peaks are labelled. The four upper quadrants are post phosphoric acid treatment and the bottom quadrant is pre phosphoric acid treatment.

The importance of this FIG. 2 is the area under the peaks.

Tile Backer Board

The invention relates to a tile backer board formulation.

The tile backer board can be formed from 35 wt % to 79.9 wt % of a cementitious material based on a final total weight of the tile backer board.

The cementitious material can be made from 29 wt % to 40 wt % of a magnesium oxide dry powder containing 80 wt % to 98 wt % of magnesium oxide based on a final total weight of the cementitious material.

The magnesium oxide can have a surface area ranging from 5 meters$^2$/gram to 50 meters$^2$/gram and an average particle size ranging from about 0.3 microns to about 90 microns, wherein more than about 90% by weight magnesium oxide particles are less than or equal to about 40 microns.

The cementitious material can be made by mixing 14 wt % of 18 wt % of a magnesium chloride dissolved in water based on a final total weight of the cementitious material with the magnesium oxide dry powder.

The magnesium chloride in aqueous solution can have from 20 wt % to 30 wt % of a magnesium chloride aqueous solution, wherein the magnesium oxide and the magnesium chloride in water, react to form a liquid suspension.

The cementitious material can include from 0.1 wt % to 10 wt % of a stabilizing material with a phosphorus-containing compound based on a final total weight of the cementitious material.

When mixed with the liquid suspension, the mixture reacts into an amorphous phase cementitious material.

The stabilizing material with the phosphorus-containing compound can be a phosphorous acid (A) based on the final total weight of the cementitious material, wherein the phosphorous acid consists of an aqueous solution of 55 wt % to 65 wt % of a concentrate of $H_3PO_3$; or a phosphoric acid (B) based on the final total weight of the cementitious material, wherein the phosphoric acid consists of an aqueous solution of 80 wt % to 90 wt % of a concentrate of $H_3PO_4$.

The cementitious material is blended from 0.1 wt % to 30 wt % of an aggregate to the amorphous phase.

The aggregate can include particles based on a final total weight of the tile backer board, having a diameter from 1 nm to 10 mm.

The aggregate can contain at least one of: wood, perlite, styrene based foam beads, calcium carbonate powder, glass particulate, and combinations thereof.

The cementitious material with aggregate is blended from 0.1 wt % to 2 wt % of a reinforcing material based on a final total weight of the tile backer board to the amorphous phase.

The reinforcing material can be a non-woven or woven silica containing mat, a non-woven or woven hydrocarbon containing mat.

In other embodiments, the reinforcing material can be chopped silica containing fibers, hemp containing fibers, nano-molecular carbon fiber strands, chopped carbon fibers, chopped hydrocarbon fiber, and combinations thereof.

The amorphous phase cementitious material containing aggregate is poured over the reinforcing material enabling a portion of the amorphous phase cementitious material to grow a plurality of crystals, each crystal can have a MW within the range of from 280 to 709, the amorphous phase cementitious material encapsulating the plurality of crystals.

A majority of stabilizing material with a phosphorus-containing compound can be consumed into a nano-molecular veneer while increasing surface area of the plurality of crystals by 2% to 49% during curing, and wherein the nano-molecular elements of the cured nano-molecular veneer are insoluble in water and the cured nano-molecular veneer protects the plurality of crystals from degradation in water at temperatures from 20 degrees to 60 degrees Celsius for from 24 hours to 56 days of the formed tile backer board.

In embodiments of the tile backer board, 0.1 weight percent to 15 weight percent biomass is added to the amorphous phase cementitious material based on the final total weight of the tile backer board.

In embodiments of the tile backer board, 0.1 wt % to 10 wt % of at least one surfactant is added to the cementitious material based on the final total weight of the tile backer board to decrease porosity of aggregate and prevent amorphous phase cementitious material from entering pores of the aggregate.

In embodiments of the tile backer board, 0.1 weight percent to 5 weight percent of a re-dispersible powder polymer based on the final total weight of the tile backer board can be incorporated in the amorphous phase cementitious material.

In embodiments of the tile backer board, the re-dispersible powder polymer can be selected from the group consisting of acrylic, silicon, polyurethane dispersion, polyurethane, alkyl carboxylic acid vinyl ester monomer, branched and unbranched alcohol(meth)acrylic acid ester monomer, vinyl aromatic monomer, olefin monomer, diene monomer and vinyl halide monomer.

In embodiments of the tile backer board, 0.1 weight percent to 5 weight percent based on the final total weight of the tile backer board of an acrylic or styrene butadiene rubber (SBR) can be blended into the amorphous cementitious material with the re-dispersible powder polymer.

In embodiments of the tile backer board, 0.1 weight percent to 5 weight percent based on the final total weight of the tile backer board of a re-dispersible polymer powder can be added to the amorphous cementitious material, wherein the re-dispersible polymer powder is a member of the group consisting of: a vinyl ethylene ester and ethylene, a vinyl laurate vinyl chloride copolymer, a vinyl ester monomers, (meth)acrylate monomer, a vinyl aromatic monomer, an olefin monomer, a 1,3-diene monomer, a vinyl halide monomer, a homopolymer or copolymer derived from one or more monomers selected from the group consisting of a vinyl acetate, a vinyl ester of an alpha-branched monocarboxylic acids having from 9 to 11 carbon atoms, a vinyl chloride, an ethylene, a methyl acrylate, a methyl methacrylate, an ethyl acrylate, an ethyl methacrylate, a propyl acrylate, a propyl methacrylate, an n-butyl acrylate, a n-butyl methacrylate, an 2-ethylhexyl acrylate.

The invention relates to a building with an interior building surface covered with the tile backer board of the formulations of the independent claims of this application.

Process for Making Tile Backer Board

The process involves blending 35 wt % to 79.9 wt % of the formed cementitious material based on a final total weight of the tile backer board with 0.1 wt % to 30 wt % of an aggregate comprising particles based on a final total weight of the tile backer board, having a diameter from 1 nm to 10 mm, wherein the aggregate comprises at least one of: wood, perlite, styrene based foam beads, calcium carbonate powder, glass particulate, and combinations thereof forming a concrete.

The process continues by pouring the concrete over 0.1 wt % to 2 wt % of a reinforcing material based on a final total weight of the tile backer board that cures into the tile backer board, the reinforcing material comprising a non-woven or woven silica containing mat, a non-woven or woven hydrocarbon containing mat.

A portion of the amorphous phase cementitious material grows a plurality of crystals, each crystal having a MW within the range of 280 to 709, the amorphous phase cementitious material encapsulating the plurality of crystals, wherein a majority of stabilizing material with a phosphorus-containing compound are consumed into a nano-molecular veneer while increasing surface area of the plurality of crystals by 2% to 49% during curing, and wherein the nano-molecular elements of the cured nano-molecular veneer are insoluble in water and the cured nano-molecular veneer protects the plurality of crystals from degradation in water at temperatures from 20 degrees to 60 degrees Celsius for from 24 hours to 56 days of the formed tile backer board.

The process involves adding 0.1 weight percent to 15 weight percent biomass added to the amorphous phase cementitious material based on the final total weight of the tile backer board and mixing from 3 to 10 minutes.

The biomass is a member of the group comprising: rice husks, corn husks, and dung.

The process includes adding 0.1 wt % to 10 wt % of at least one surfactant to the cementitious material based on the final total weight of the tile backer board to decrease porosity of aggregate and prevent amorphous phase cementitious material from entering pores of the aggregate.

The surfactant can be a detergent.

The process can involves adding 0.1 weight percent to 5 weight percent of a re-dispersible powder polymer based on the final total weight of the tile backer board incorporated in the amorphous phase cementitious material and mixing from 3 to 10 minutes.

The re-dispersible powder polymer can be selected from the group consisting of silicon, polyurethane dispersion, polyurethane, alkyl carboxylic acid vinyl ester monomer, branched and unbranched alcohol(meth)acrylic acid ester monomer, vinyl aromatic monomer, olefin monomer, diene monomer and vinyl halide monomer or a vinyl acetate ethylene “VAE”.

The process can include adding 0.1 weight percent to 5 weight percent based on the final total weight of the tile backer board of an acrylic or styrene butadiene rubber (SBR) into the amorphous cementitious material while the re-dispersible powder polymer is added.

The invention includes an interior building surface covered with tile backer board made by the process.

Another embodiment of the process for making a tile backer board involves forming a cementitious material by blending 29 wt % to 40 wt % of a magnesium oxide dry powder containing 80 wt % to 98 wt % of magnesium oxide based on a final total weight of the based on the cementitious material with 14 wt % of 18 wt % of a magnesium chloride dissolved in water based on based on the final total weight of the cementitious material.

The magnesium oxide and the magnesium chloride in water, react to form a liquid suspension.

The next step involves mixing the liquid suspension for from 2 minutes to 10 minutes while minimizing adding gas into the liquid suspension, then adding 0.1 wt % to 10 wt % of a stabilizing material with a phosphorus-containing compound based on a final total weight of the cementitious material to the liquid suspension.

In this version of the process, the liquid suspension with stabilizing material reacts into the amorphous phase cementitious material during a period of time from 1 minute to 4 minutes.

The process includes blending 35 wt % to 79.9 wt % of the formed amorphous phase cementitious material based on the final total weight of the tile backer board with 0.1 wt % to 30 wt % of an aggregate based on the total weight of the tile backer board comprising particles having a diameter from 1 nm to 10 mm, wherein the aggregate comprises at least one of, wood, perlite, styrene based foam beads, calcium carbonate powder, and combinations thereof.

The next step involves mixing in 0.1 wt % to 15 wt % of a reinforcing material based on the final total weight of the tile backer board, the reinforcing material comprising at least one of: chopped silica containing fibers, hemp containing fibers; nano-molecular carbon fiber strands; chopped carbon fibers; chopped hydrocarbon fiber; and combinations thereof.

A portion of the amorphous phase cementitious material grows a plurality of crystals, each crystal having a MW within the range of 283 to 709, the amorphous phase cementitious material encapsulating the plurality of crystals, wherein a majority of stabilizing material with a phosphorus-containing compound are consumed into a nano-molecular veneer while increasing surface area of the plurality of crystals by 2% to 49% during curing, and wherein the nano-molecular elements of the cured nano-molecular veneer are insoluble in water and the cured nano-molecular veneer protects the plurality of crystals from degradation in water at temperatures from 20 degrees to 60 degrees Celsius for from 24 hours to 56 days of the formed tile backer board.

The process involves adding 0.1 weight percent to 15 weight percent biomass which is added to the amorphous phase cementitious material based on the final total weight of the tile backer board, wherein the biomass is a member of the group comprising: rice husks, corn husks, and dung.

EXAMPLES

Example 1

A process to make a cementitious construction cementitious material follows:

The process produces a cementitious material with a 78% crystallized portion with 12% of an amorphous nano-molecular veneer substantially free of crystalline silica.

To create the cementitious material, first a gel phase is formed by blending together magnesium oxide powder with a purity of 85% by weight and a magnesium chloride in a brine with density of 1.26.

The magnesium oxide is blended in a weight ratio of 2:1 with the magnesium chloride based on the total final weight of the cementitious construction material.

Next, from 20 weight percent of aggregate from wood is added to the gel phase forming the amorphous phase.

To the amorphous phase, 5 weight percent of phosphoric acid is added based on the total final weight of the cementitious construction material.

To complete forming of the cementitious material, 65% of the amorphous phase is crystalized by extruding the amorphous phase between two layers of fiberglass on a carrier sheet. The sandwich-like material is cured at 45-55 degrees C. for 12-24 hours at a relative humidity greater than 55% creating a board with a thickness of 12 mm.

A nano-molecular veneer is formed over the crystallized portion with a veneer thickness of 1 micron encapsulating the portion of the crystallized portion without producing detectable magnesium phosphate. The nano-molecular veneer has a 30% increase in surface area as compared to veneer-free crystallized portions.

The final crystallized portion with nano-molecular veneer is configured to resist degradation in water having a temperature at 60 degrees C. for 48 hours.

Example 2

A cementitious material is formed.

The cementitious material has 34 wt % of a magnesium oxide dry powder containing 85 wt % purity of magnesium oxide based on a final total weight of the cementitious material.

The novel cementitious material is formed by combining 34 wt % of a magnesium oxide dry powder containing 85 wt % purity of magnesium oxide based on a final total weight of the cementitious material.

The magnesium oxide used has a surface area ranging from 5 meters$^2$/gram to 50 meters$^2$/gram and an average particle size ranging from about 0.3 to about 90 microns wherein more than about 90% by weight magnesium oxide particles are less than or equal to about 40 microns.

16 wt % of a magnesium chloride was dissolved in water based on a final total weight of the cementitious material. The magnesium chloride in aqueous solution was: 29 wt % of a magnesium chloride aqueous solution. The magnesium oxide and the magnesium chloride in water reacted to form a liquid suspension.

1.3 wt % of a stabilizing material with a phosphorus-containing compound based on a final total weight of the cementitious material was then mixed with the liquid suspension and the mixture reacted into an amorphous phase cementitious material.

The stabilizing material with the phosphorus-containing compound was phosphoric acid (B) based on the final total weight of the cementitious material, wherein the phosphoric acid consisted of an aqueous solution of 85 wt % of a concentrate of $H_3PO_4$. The mixture reacted into an amorphous phase cementitious material.

The amorphous phase cementitious material grows a plurality of crystals, each crystal having a MW of 530 generating nano-molecular elements that project from the plurality of crystals, encapsulating the plurality of crystals, wherein a majority of stabilizing material with a phosphorus-containing compound are consumed into the non-molecular veneer while increasing surface area of the plurality of crystals by 49%, and wherein the nano-molecular elements of the nano-molecular veneer are insoluble in water and the nano-molecular veneer protects the plurality of crystals from degradation in water at 60 degrees Celsius for 24 hours forming the cementitious material.

Example 3

The cementitious material of this example has 35 wt % of a magnesium oxide dry powder containing 80 wt % purity of magnesium oxide based on a final total weight of the cementitious material.

The magnesium oxide used has a surface area ranging from 5 meters$^2$/gram to 50 meters$^2$/gram and an average particle size ranging from about 0.3 to about 90 microns wherein more than about 90% by weight magnesium oxide particles are less than or equal to about 40 microns.

15 wt % of a magnesium chloride dissolved in water based on a final total weight of the cementitious material was mixed with the magnesium oxide, In this example, the magnesium chloride in aqueous solution was a 27 wt % a magnesium chloride aqueous solution. The magnesium oxide and the magnesium chloride in water were mixed and react to form a liquid suspension.

2.5 wt % of a stabilizing material with a phosphorus-containing compound based on a final total weight of the cementitious material was mixed with the liquid suspension, the mixture reacted into an amorphous phase cementitious material, the stabilizing material with the phosphorus-containing compound contained a phosphorous acid (A) based on the final total weight of the cementitious material. The phosphorous acid consisted of an aqueous solution of 60 wt % of a concentrate of $H_3PO_3$.

A portion of the amorphous phase cementitious material grew a plurality of crystals, developed with each crystal having a MW of 283, 413, 530, or 709, generating nano-molecular elements that projected from the plurality of crystals, encapsulating the plurality of crystals.

A majority of phosphorous-containing compounds from the stabilizing material with a phosphorus-containing compound were consumed into the non-molecular veneer while increasing surface area of the plurality of crystals by 2 to 49%.

The nano-molecular elements of the nano-molecular veneer were insoluble in water and the nano-molecular veneer protected the plurality of crystals from degradation in water at 60 degrees Celsius for 24 hours as the cementitious material.

FIGS. 3A-3H show many samples of the formulation of the cementitious material and their associated physical properties.

Sample 1 contains 29 wt % of a magnesium oxide dry powder based on a final total weight of the cementitious material was used. The magnesium oxide dry powder containing 85 wt % purity of magnesium oxide.

The magnesium oxide had a surface area ranging from 5 meters$^2$/gram to 50 meters$^2$/gram and an average particle size ranging from about 0.3 to about 90 microns wherein more than about 90% by weight magnesium oxide particles were less than or equal to about 40 microns.

The magnesium oxide was blended with 14 wt % of a magnesium chloride dissolved in water based on a final total weight of the cementitious material.

For Sample 1, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 0.1 wt % of a stabilizing material with a phosphorus-containing compound based on a final total weight of the cementitious material to the mixed liquid suspension.

For Sample 1, the stabilizing material with the phosphorus-containing compound was a phosphorous acid based on the final total weight of the cementitious material, wherein the phosphorous acid consists of an aqueous solution of 60 wt % of a concentrate of $H_3PO_3$.

The liquid suspension with stabilizing material was permitted to react into an amorphous phase cementitious material for a period of time of 2 minutes.

The flowable, uncured cementitious material was then poured on a mold to cure and form a cement.

For this Sample 1, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by 2% to 20 m$^2$/g.

The cured material of Sample 1 formed a cementitious material which as stable in water at 60 degrees Celsius for 24 hours using the Jet Products, LLC Warm Water Stability Test as authenticated by Clemson University Chemical Engineering Department in 2017.

Sample 2

Sample 2 contains 40 wt % of a magnesium oxide dry powder containing 85 wt % of magnesium oxide based on a final total weight of the of the cementitious material was used.

The magnesium oxide had a surface area ranging from 5 meters$^2$/gram to 50 meters$^2$/gram and an average particle size ranging from about 0.3 to about 90 microns wherein more than about 90% by weight magnesium oxide particles were less than or equal to about 40 microns.

The magnesium oxide was blended with 18 wt % of a magnesium chloride dissolved in water based on a final total weight of the cementitious material.

For Sample 2, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 10 wt % of a stabilizing material with a phosphorus-containing compound based on a final total weight of the cementitious material to the mixed liquid suspension.

For Sample 2, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

The flowable, uncured cementitious material was then poured on a mold and cured, forming a cement.

For this Sample 2, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by 49% to 29 m$^2$/g.

The cured material of Sample 2 formed a cementitious material which as stable in water at 60 degrees Celsius for 24 hours using the Jet Products, LLC Warm Water Stability Test as authenticated by Clemson University Chemical Engineering Department in 2017.

Sample 3

Sample 3 contains 32 wt % of a magnesium oxide dry powder containing 85 wt % of magnesium oxide based on a final total weight of the of the cementitious material was used.

The magnesium oxide had a surface area ranging from 5 meters$^2$/gram to 50 meters$^2$/gram and an average particle size ranging from about 0.3 to about 90 microns wherein more than about 90% by weight magnesium oxide particles were less than or equal to about 40 microns.

The magnesium oxide was blended with 17 wt % of a magnesium chloride dissolved in water based on a final total weight of the cementitious material.

For Sample 3, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 0.1 wt % of a stabilizing material with a phosphorus-containing compound based on a final total weight of cementitious material the mixed liquid suspension.

For Sample 3, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

The reinforcing component was a non-woven silica-containing mat. The reinforcing component was 0.1 wt % based on the total final weight of the cementitious material.

For this Sample 3, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by 2% to 20 $m^2/g$.

The cured material of Sample 3 formed a cementitious material which as stable in water at 60 degrees Celsius for 24 hours using the Jet Products, LLC Warm Water Stability Test as authenticated by Clemson University Chemical Engineering Department in 2017.

Sample 4

Sample 4 contains 31 wt % of a magnesium oxide dry powder containing 85 wt % of magnesium oxide based on a final total weight of the of the cementitious material was used.

The magnesium oxide had a surface area ranging from 5 $meters^2$/gram to 50 $meters^2$/gram and an average particle size ranging from about 0.3 to about 90 microns wherein more than about 90% by weight magnesium oxide particles were less than or equal to about 40 microns.

The magnesium oxide was blended with 16 wt % of a magnesium chloride dissolved in water based on a final total weight of the cementitious material.

For Sample 4, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 1 wt % of a stabilizing material with a phosphorus-containing compound based on a final total weight of the cementitious material to the mixed liquid suspension.

For Sample 4, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

The reinforcing component was 2 wt % chopped silica fibers based on the total final weight of the cementitious material.

For this Sample 4, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by 23% to 24 $m^2/g$.

The cured material of Sample 4 formed a cementitious material which as stable in water at 60 degrees Celsius for 24 hours using the Jet Products, LLC Warm Water Stability Test as authenticated by Clemson University Chemical Engineering Department in 2017.

Sample 5

Sample 5 contains 32.5 wt % of a magnesium oxide dry powder containing 85 wt % of magnesium oxide based on a final total weight of the cementitious material was used.

The magnesium oxide had a surface area ranging from 5 $meters^2$/gram to 50 $meters^2$/gram and an average particle size ranging from about 0.3 to about 90 microns wherein more than about 90% by weight magnesium oxide particles were less than or equal to about 40 microns.

The magnesium oxide was blended with 17.5 wt % of a magnesium chloride dissolved in water based on a final total weight of the cementitious material.

For Sample 5, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 1.75 wt % of a stabilizing material with a phosphorus-containing compound based on a final total weight of the cementitious material to the mixed liquid suspension.

For Sample 5, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

Sample 5 contains 0.1 wt % of aggregate component known as wood:perlite:styrene based foam beads in a 30:8:1 ratio based on the total final weight of the cementitious material was added into the amorphous phase cementitious material forming a flowable concrete.

The flowable, uncured concrete was then poured on a mold and cured to make a finished concrete.

For this Sample 5, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by more than 38% to 27 $m^2/g$.

The cured material of Sample 5 formed a cementitious material which as stable in water at 60 degrees Celsius for 24 hours using the Jet Products, LLC. Warm Water Stability Test as authenticated by Clemson University Chemical Engineering Department in 2017.

Sample 6

Sample 6 contains 33 wt % of a magnesium oxide dry powder containing 85 wt % of magnesium oxide based on a final total weight of the cementitious material was used.

The magnesium oxide had a surface area ranging from 5 $meters^2$/gram to 50 $meters^2$/gram and an average particle size ranging from about 0.3 to about 90 microns wherein more than about 90% by weight magnesium oxide particles were less than or equal to about 40 microns.

The magnesium oxide was blended with 18 wt % of a magnesium chloride dissolved in water based on a final total weight of the cementitious material.

For Sample 6, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 2.5 wt % of a stabilizing material with a phosphorus-containing compound based on a final total weight of the cementitious material the mixed liquid suspension.

For Sample 6, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

Sample 6 contains 30 wt % of aggregate component of wood:perlite:styrene based foam beads in a 30:8:1 ratio based on the total final weight of the cementitious material was added into the amorphous phase cementitious material forming a flowable concrete.

The flowable, uncured concrete was then poured into a mold and cured to make a finished concrete.

For this Sample 6, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by more than 49% to 29 $m^2/g$.

The cured material of Sample 6 formed a cementitious material which as stable in water at 60 degrees Celsius for 24 hours using the Jet Products, LLC Warm Water Stability Test as authenticated by Clemson University Chemical Engineering Department in 2017.

Sample 7

Sample 7 contains 33 wt % of a magnesium oxide dry powder containing 85 wt % of magnesium oxide based on a final total weight of the cementitious material was used.

The magnesium oxide had a surface area ranging from 5 $meters^2/gram$ to 50 $meters^2/gram$ and an average particle size ranging from about 0.3 to about 90 microns wherein more than about 90% by weight magnesium oxide particles were less than or equal to about 40 microns.

The magnesium oxide was blended with 19 wt % of a magnesium chloride dissolved in water based on a final total weight of the cementitious material.

For Sample 7, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 3.75 wt % of a stabilizing material with a phosphorus-containing compound based on a final total weight of the cementitious material to the mixed liquid suspension.

For Sample 7, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

Sample 7 contains a biomass of 0.1 weight percent based on the total final weight of the cementitious material. The biomass of this sample was rice husks.

For this Sample 7, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by 49% to 29 $m^2/g$.

The cured material of Sample 7 formed a cementitious material which as stable in water at 60 degrees Celsius for 24 hours using the Jet Products, LLC Warm Water Stability Test as authenticated by Clemson University Chemical Engineering Department in 2017.

Sample 8

Sample 8 contains 32 wt % of a magnesium oxide dry powder containing 85 wt % of magnesium oxide based on a final total weight of the cementitious material was used.

The magnesium oxide had a surface area ranging from 5 $meters^2/gram$ to 50 $meters^2/gram$ and an average particle size ranging from about 0.3 to about 90 microns wherein more than about 90% by weight magnesium oxide particles were less than or equal to about 40 microns.

The magnesium oxide was blended with 17 wt % of a magnesium chloride dissolved in water based on a final total weight of the cementitious material.

For Sample 7, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 5 wt % of a stabilizing material with a phosphorus-containing compound based on a final total weight of the cementitious material to the mixed liquid suspension.

For Sample 8, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

Sample 8 contains 15 wt % of biomass based on the total final weight of the cementitious material was added into the amorphous phase cementitious material forming a flowable concrete. The biomass was corn husks.

The flowable, uncured concrete was then poured into a mold, the finished material forming a concrete.

For this Sample 8, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by more than 44% to 28 $m^2/g$.

The cured material of Sample 8 formed a cementitious material which as stable in water at 60 degrees Celsius for 24 hours using the Jet Products, LLC Warm Water Stability Test as authenticated by Clemson University Chemical Engineering Department in 2017.

Sample 9

Sample 9 contains 35 wt % of a magnesium oxide dry powder containing 85 wt % of magnesium oxide based on a final total weight of the cementitious material was used.

The magnesium oxide had a surface area ranging from 5 meters$^2$/gram to 50 meters$^2$/gram and an average particle size ranging from about 0.3 to about 90 microns wherein more than about 90% by weight magnesium oxide particles were less than or equal to about 40 microns.

The magnesium oxide was blended with 16 wt % of a magnesium chloride dissolved in water based on a final total weight of the cementitious material.

For Sample 9, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 6.25 wt % of a stabilizing material with a phosphorus-containing compound based on a final total weight of the cementitious material to the mixed liquid suspension.

For Sample 9, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

0.1 weight percent of a surfactant, namely a detergent was added to the amorphous phase cementitious material based on the final total weight of the cementitious material.

The flowable, uncured concrete was then poured into a mold forming a finished concrete.

For this Sample 9, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by 23% to 24 $m^2/g$.

The cured material of Sample 9 formed a cementitious material which as stable in water at 60 degrees Celsius for 24 hours using the Jet Products, LLC Warm Water Stability Test as authenticated by Clemson University Chemical Engineering Department in 2017.

Sample 10

Sample 10 contains 30 wt % of a magnesium oxide dry powder containing 85 wt % of magnesium oxide based on a final total weight of the cementitious material was used.

The magnesium oxide had a surface area ranging from 5 meters$^2$/gram to 50 meters$^2$/gram and an average particle size ranging from about 0.3 to about 90 microns wherein more than about 90% by weight magnesium oxide particles were less than or equal to about 40 microns.

The magnesium oxide was blended with 18 wt % of a magnesium chloride dissolved in water based on a final total weight of the cementitious material.

For Sample 10, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 7.5 wt % of a stabilizing material with a phosphorus-containing compound based on a final total weight of the cementitious material to the mixed liquid suspension.

For Sample 10, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

Sample 10 contains 10 wt % of sodium stearate as a surfactant, based on the total final weight of the cementitious material was added into the amorphous phase cementitious material forming a flowable concrete.

The flowable, uncured concrete was then poured in a mold forming a finished concrete.

For this Sample 10, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by more than 38% to 27 $m^2/g$.

The cured material of Sample 10 formed a cementitious material which as stable in water at 60 degrees Celsius for 24 hours using the Jet Products, LLC Warm Water Stability Test as authenticated by Clemson University Chemical Engineering Department in 2017.

Sample 11

Sample 11 contains 33 wt % of a magnesium oxide dry powder containing 85 wt % of magnesium oxide based on a final total weight of the cementitious material was used.

The magnesium oxide had a surface area ranging from 5 meters$^2$/gram to 50 meters$^2$/gram and an average particle size ranging from about 0.3 to about 90 microns wherein more than about 90% by weight magnesium oxide particles were less than or equal to about 40 microns.

The magnesium oxide was blended with 15 wt % of a magnesium chloride dissolved in water based on a final total weight of the cementitious material.

For Sample 11, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 8.75 wt % of a stabilizing material with a phosphorus-containing compound based on a final total weight of the cementitious material to the mixed liquid suspension.

For Sample 11, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

0.1 weight percent of re-dispersible polymer, namely vinyl acetate ethylene (VAE) was added to the amorphous phase cementitious material based on the final total weight of the cementitious material.

The flowable, uncured concrete was then poured into a mold forming a finished concrete.

For this Sample 11, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by more than 49% to 29 $m^2/g$.

The cured material of Sample 11 formed a cementitious material which as stable in water at 60 degrees Celsius for 24 hours using the Jet Products, LLC Warm Water Stability Test as authenticated by Clemson University Chemical Engineering Department in 2017.

Sample 12

Sample 12 contains 32 wt % of a magnesium oxide dry powder containing 85 wt % of magnesium oxide based on a final total weight of the cementitious material was used.

The magnesium oxide had a surface area ranging from 5 $meters^2/gram$ to 50 $meters^2/gram$ and an average particle size ranging from about 0.3 to about 90 microns wherein more than about 90% by weight magnesium oxide particles were less than or equal to about 40 microns.

The magnesium oxide was blended with 19 wt % of a magnesium chloride dissolved in water based on a final total weight of the cementitious material.

For Sample 12, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 10 wt % of a stabilizing material with a phosphorus-containing compound based on a final total weight of the cementitious material to the mixed liquid suspension.

For Sample 12, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

Sample 12 contains 5 wt % of vinyl acetate ethylene based on the total final weight of the cementitious material was added into the amorphous phase cementitious material forming a flowable concrete.

The flowable, uncured concrete was then poured into a mold forming finished concrete.

For this Sample 12, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by 49% to 29 $m^2/g$.

The cured material of Sample 12 formed a cementitious material which as stable in water at 60 degrees Celsius for 24 hours using the Jet Products, LLC Warm Water Stability Test as authenticated by Clemson University Chemical Engineering Department in 2017.

Example 4

A process to make a cementitious construction tile backer board follows:

The process produces a tile backer board with a 78% crystallized portion with 12% of an amorphous nano-molecular veneer substantially free of crystalline silica.

To create the tile backer board, first a gel phase is formed by blending together magnesium oxide powder with a purity of 85% by weight and a magnesium chloride in a brine with density of 1.26.

The magnesium oxide is blended in a weight ratio of 2:1 with the magnesium chloride based on the total final weight of the cementitious construction material.

Next, from 20 weight percent of aggregate from wood is added to the gel phase forming the amorphous phase.

To the amorphous phase, 5 weight percent of phosphoric acid is added based on the total final weight of the cementitious construction material.

To complete forming of the tile backer board, 65% of the amorphous phase is crystalized by extruding the amorphous phase between two layers of fiberglass on a carrier sheet. The sandwich-like material is cured at 45-55 degrees C. for 12-24 hours at a relative humidity greater than 55% creating a board with a thickness of 12 mm.

A nano-molecular veneer is formed over the crystallized portion with a veneer thickness of 1 micron encapsulating the portion of the crystallized portion without producing detectable magnesium phosphate. The nano-molecular veneer has a 30% increase in surface area as compared to veneer-free crystallized portions.

The final crystallized portion with nano-molecular veneer is configured to resist degradation in water having a temperature at 60 degrees C. for 48 hours.

Example 5

A tile backer board is formed with 70 wt % cementitious material.

The cementitious material has 34 wt % of a magnesium oxide dry powder containing 85 wt % purity of magnesium oxide based on a final total weight of the cementitious material.

The magnesium oxide used has a surface area ranging from 5 $meters^2/gram$ to 50 $meters^2/gram$ and an average particle size ranging from about 0.3 to about 90 microns wherein more than about 90% by weight magnesium oxide particles are less than or equal to about 40 microns.

16 wt % of a magnesium chloride was dissolved in water based on a final total weight of the cementitious material. The magnesium chloride in aqueous solution was: 29 wt % of a magnesium chloride aqueous solution. The magnesium oxide and the magnesium chloride in water, reacted to form a liquid suspension.

1.3 wt % of a stabilizing material with a phosphorus-containing compound based on a final total weight of the cementitious material was then mixed with the liquid suspension and the mixture reacted into an amorphous phase cementitious material.

The stabilizing material with the phosphorus-containing compound was phosphoric acid (B) based on the final total weight of the cementitious material, wherein the phosphoric acid consisted of an aqueous solution of 85 wt % of a concentrate of $H_3PO_4$. The mixture reacted into an amorphous phase cementitious material.

Next 14 wt % of an aggregate with particles having a diameter from 1 nm to 10 mm was added to the amorphous phase cementitious material.

The aggregate contained perlite.

Additionally, 1.5 wt % of a reinforcing material based on the total weight of the formed tile backer board was used.

The reinforcing material was a woven silica containing mat.

The amorphous phase cementitious material containing aggregate was poured over the reinforcing material enabling a portion of the amorphous phase cementitious material to grow a plurality of crystals, each crystal having a MW of 530 generating nano-molecular elements that project from the plurality of crystals, encapsulating the plurality of crystals, wherein a majority of stabilizing material with a phosphorus-containing compound are consumed into the non-molecular veneer while increasing surface area of the plurality of crystals by 49%, and wherein the nano-molecular elements of the nano-molecular veneer are insoluble in water and the nano-molecular veneer protects the plurality of crystals from degradation in water at 60 degrees Celsius for 24 hours forming the tile backer board.

Example 6

A tile backer board was formed using 65 wt % cementitious material.

The cementitious material has 35 wt % of a magnesium oxide dry powder containing 80 wt % purity of magnesium oxide based on a final total weight of the cementitious material.

The magnesium oxide used has a surface area ranging from 5 meters$^2$/gram to 50 meters$^2$/gram and an average particle size ranging from about 0.3 to about 90 microns wherein more than about 90% by weight magnesium oxide particles are less than or equal to about 40 microns.

15 wt % of a magnesium chloride dissolved in water based on a final total weight of the cementitious material was mixed with the magnesium oxide, In this example, the magnesium chloride in aqueous solution was a 27 wt % a magnesium chloride aqueous solution. The magnesium oxide and the magnesium chloride in water, were mixed and react to form a liquid suspension.

2.5 wt % of a stabilizing material with a phosphorus-containing compound based on a final total weight of the cementitious material was mixed with the liquid suspension, the mixture reacted into an amorphous phase cementitious material, the stabilizing material with the phosphorus-containing compound contained a phosphorous acid (A) based on the final total weight of the cementitious material. The phosphorous acid consisted of an aqueous solution of 60 wt % of a concentrate of $H_3PO_3$.

To the amorphous phase cementitious material was added 12 wt % of an aggregate with particles having a diameter from 1 nm to 10 mm. The aggregate was a mixture of styrene based foam beads and calcium carbonate powder.

Additionally, 7 wt % of a reinforcing material based on the total weight of the formed tile backer board was added with the aggregate. The reinforcing material contained chopped silica containing fibers; hemp containing fibers; nano-molecular carbon fiber strands; chopped carbon fibers; and chopped hydrocarbon fiber; in a 1:1:1:1:1 parts to each other.

After the aggregate was added a portion of the amorphous phase cementitious material a plurality of crystals developed with each crystal having a MW of 283, 413, 530, or 709, generating nano-molecular elements that projected from the plurality of crystals, encapsulating the plurality of crystals.

A majority of phosphorous-containing compounds from the stabilizing material with a phosphorus-containing compound were consumed into the non-molecular veneer while increasing surface area of the plurality of crystals by 2 to 49%.

The nano-molecular elements of the nano-molecular veneer were insoluble in water and the nano-molecular veneer protected the plurality of crystals from degradation in water at 60 degrees Celsius for 24 hours as the tile backer board.

FIGS. 3I-3T show many samples of the formulation of the tile backer board and their associated physical properties.

Sample 1 (this reference to "Sample 1" and the following "Sample" references refer to one of FIGS. 3I-3T) contains 29 wt % of a magnesium oxide dry powder based on a final total weight of the cementitious material was used. The magnesium oxide dry powder containing 85 wt % purity of magnesium oxide.

The magnesium oxide had a surface area ranging from 5 meters$^2$/gram to 50 meters$^2$/gram and an average particle size ranging from about 0.3 to about 90 microns wherein more than about 90% by weight magnesium oxide particles were less than or equal to about 40 microns.

The magnesium oxide was blended with 14 wt % of a magnesium chloride dissolved in water based on a final total weight of the cementitious material.

For Sample 1, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 0.1 wt % of a stabilizing material with a phosphorus-containing compound based on a final total weight of the cementitious material to the mixed liquid suspension.

For Sample 1, the stabilizing material with the phosphorus-containing compound was a phosphorous acid based on the final total weight of the cementitious material, wherein the phosphorous acid consists of an aqueous solution of 60 wt % of a concentrate of $H_3PO_3$.

The liquid suspension with stabilizing material was permitted to react into an amorphous phase cementitious material for a period of time of 2 minutes.

Sample 1 contains 0.1 wt % of aggregate component known as wood (fibers) based on the total final weight of the tile backer board was added into the amorphous phase cementitious material forming a flowable concrete.

The flowable, uncured concrete was then poured over a reinforcing component forming a reinforced concrete.

The reinforcing component was a non-woven silica containing mat that weighed 0.1 wt % based on the total final weight of the formed tile backer board.

For this Sample 1, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by 2% to 20 $m^2/g$.

The cured material of Sample 1 formed a tile backer board which as stable in water at 60 degrees Celsius for 24 hours using the Jet Products, LLC Warm Water Stability Test as authenticated by Clemson University Chemical Engineering Department in 2017.

Sample 2

Sample 2 contains 40 wt % of a magnesium oxide dry powder containing 85 wt % of magnesium oxide based on a final total weight of the of the cementitious material was used.

The magnesium oxide had a surface area ranging from 5 $meters^2/gram$ to 50 $meters^2/gram$ and an average particle size ranging from about 0.3 to about 90 microns wherein more than about 90% by weight magnesium oxide particles were less than or equal to about 40 microns.

The magnesium oxide was blended with 18 wt % of a magnesium chloride dissolved in water based on a final total weight of the cementitious material.

For Sample 2, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 10 wt % of a stabilizing material with a phosphorus-containing compound based on a final total weight of the tile backer board to the mixed liquid suspension.

For Sample 2, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

Sample 2 contains 30 wt % of aggregate component known as wood (fibers) based on the total final weight of the tile backer board was added into the amorphous phase cementitious material forming a flowable concrete.

The flowable, uncured concrete was then poured over a reinforcing component forming a reinforced concrete.

The reinforcing component was a woven silica containing mat. The reinforcing component was 2 wt % based on the total final weight of the tile backer board.

For this Sample 2, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by 49% to 29 $m^2/g$ The cured material of Sample 2 formed a tile backer board which as stable in water at 60 degrees Celsius for 24 hours using the Jet Products, LLC Warm Water Stability Test as authenticated by Clemson University Chemical Engineering Department in 2017.

Sample 3

Sample 3 contains 32 wt % of a magnesium oxide dry powder containing 85 wt % of magnesium oxide based on a final total weight of the of the cementitious material was used.

The magnesium oxide had a surface area ranging from 5 $meters^2/gram$ to 50 $meters^2/gram$ and an average particle size ranging from about 0.3 to about 90 microns wherein more than about 90% by weight magnesium oxide particles were less than or equal to about 40 microns.

The magnesium oxide was blended with 17 wt % of a magnesium chloride dissolved in water based on a final total weight of the cementitious material.

For Sample 3, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 0.1 wt % of a stabilizing material with a phosphorus-containing compound based on a final total weight of cementitious material the mixed liquid suspension.

For Sample 3, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

Sample 3 contains 15 wt % of aggregate component known as perlite based on the total final weight of the tile backer board was added into the amorphous phase cementitious material forming a flowable concrete.

0.1 weight percent of a biomass known as rice husks was added to the amorphous phase cementitious material based on the final total weight of the tile backer board.

The flowable, uncured concrete was then poured over a reinforcing component forming a reinforced concrete.

The reinforcing component was a non-woven hydrocarbon-containing mat. The reinforcing component was 0.1 wt % based on the total final weight of the tile backer board.

For this Sample 3, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by 2% to 20 $m^2/g$.

The cured material of Sample 3 formed a tile backer board which as stable in water at 60 degrees Celsius for 24 hours using the Jet Products, LLC Warm Water Stability Test as authenticated by Clemson University Chemical Engineering Department in 2017.

Sample 4

Sample 4 contains 31 wt % of a magnesium oxide dry powder containing 85 wt % of magnesium oxide based on a final total weight of the of the cementitious material was used.

The magnesium oxide had a surface area ranging from 5 meters$^2$/gram to 50 meters$^2$/gram and an average particle size ranging from about 0.3 to about 90 microns wherein more than about 90% by weight magnesium oxide particles were less than or equal to about 40 microns.

The magnesium oxide was blended with 16 wt % of a magnesium chloride dissolved in water based on a final total weight of the cementitious material.

For Sample 4, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 1 wt % of a stabilizing material with a phosphorus-containing compound based on a final total weight of the cementitious material to the mixed liquid suspension.

For Sample 4, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

Sample 4 contains 15 wt % of aggregate component known as perlite based on the total final weight of the tile backer board was added into the amorphous phase cementitious material forming a flowable concrete.

15 weight percent of a biomass known as corn husks was added to the amorphous phase cementitious material based on the final total weight of the tile backer board.

The flowable, uncured concrete was then poured over a reinforcing component forming a reinforced concrete.

The reinforcing component was a woven hydrocarbon-containing mat. The reinforcing component was 0.1 wt % based on the total final weight of the cementitious material.

For this Sample 4, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by 23% to 24 m$^2$/g.

The cured material of Sample 4 formed a tile backer board which as stable in water at 60 degrees Celsius for 24 hours using the Jet Products, LLC Warm Water Stability Test as authenticated by Clemson University Chemical Engineering Department in 2017.

Sample 5

Sample 5 contains 32.5 wt % of a magnesium oxide dry powder containing 85 wt % of magnesium oxide based on a final total weight of the cementitious material was used.

The magnesium oxide had a surface area ranging from 5 meters$^2$/gram to 50 meters$^2$/gram and an average particle size ranging from about 0.3 to about 90 microns wherein more than about 90% by weight magnesium oxide particles were less than or equal to about 40 microns.

The magnesium oxide was blended with 17.5 wt % of a magnesium chloride dissolved in water based on a final total weight of the cementitious material.

For Sample 5, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 1.75 wt % of a stabilizing material with a phosphorus-containing compound based on a final total weight of the cementitious material to the mixed liquid suspension.

For Sample 5, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

Sample 5 contains 15 wt % of aggregate component known as styrene based foam beads based on the total final weight of the tile backer board was added into the amorphous phase cementitious material forming a flowable concrete.

Sample 5 contains 0.1 wt % detergent as a surfactant based on the total final weight of the tile backer board which is added to the amorphous phase cementitious material to decrease porosity of aggregate and prevent amorphous phase cementitious material from entering pores of the aggregate.

Sample 5 contains 1 wt % chopped silica containing fibers based on the total final weight of the tile backer board.

The flowable, uncured concrete was then poured over a reinforcing component forming a reinforced concrete.

The reinforcing component was a non-woven silica containing mat. The reinforcing component was 0.1 wt % based on the total final weight of the tile backer board.

For this Sample 5, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by more than 38% to 27 m$^2$/g.

The cured material of Sample 5 formed a tile backer board which as stable in water at 60 degrees Celsius for 24 hours using the Jet Products, LLC. Warm Water Stability Test as authenticated by Clemson University Chemical Engineering Department in 2017.

Sample 6

Sample 6 contains 33 wt % of a magnesium oxide dry powder containing 85 wt % of magnesium oxide based on a final total weight of the cementitious material was used.

The magnesium oxide had a surface area ranging from 5 meters$^2$/gram to 50 meters$^2$/gram and an average particle size ranging from about 0.3 to about 90 microns wherein more than about 90% by weight magnesium oxide particles were less than or equal to about 40 microns.

The magnesium oxide was blended with 18 wt % of a magnesium chloride dissolved in water based on a final total weight of the cementitious material.

For Sample 6, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 2.5 wt % of a stabilizing material with a phosphorus-containing compound based on a final total weight of the cementitious material the mixed liquid suspension.

For Sample 6, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

Sample 6 contains 15 wt % of aggregate component known as glass particulate based on the total final weight of the tile backer board was added into the amorphous phase cementitious material forming a flowable concrete.

Sample 6 contains 10 wt % sodium stearate as a surfactant based on the total final weight of the tile backer board which is added to the amorphous phase cementitious material to decrease porosity of aggregate and prevent amorphous phase cementitious material from entering pores of the aggregate.

Sample 6 contains 10 wt % chopped silica containing fibers based on the total final weight of the tile backer board.

The flowable, uncured concrete was then poured over a reinforcing component forming a reinforced concrete.

The reinforcing component was a woven silica containing mat. The reinforcing component was 0.1 wt % based on the total final weight of the tile backer board.

For this Sample 6, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by more than 49% to 29 $m^2/g$.

The cured material of Sample 6 formed a tile backer board which as stable in water at 60 degrees Celsius for 24 hours using the Jet Products, LLC Warm Water Stability Test as authenticated by Clemson University Chemical Engineering Department in 2017.

Sample 7

Sample 7 contains 33 wt % of a magnesium oxide dry powder containing 85 wt % of magnesium oxide based on a final total weight of the cementitious material was used.

The magnesium oxide had a surface area ranging from 5 $meters^2/gram$ to 50 $meters^2/gram$ and an average particle size ranging from about 0.3 to about 90 microns wherein more than about 90% by weight magnesium oxide particles were less than or equal to about 40 microns.

The magnesium oxide was blended with 19 wt % of a magnesium chloride dissolved in water based on a final total weight of the cementitious material.

For Sample 7, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 3.75 wt % of a stabilizing material with a phosphorus-containing compound based on a final total weight of the cementitious material to the mixed liquid suspension.

For Sample 7, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

Sample 7 contains 11 wt % of aggregate component as a ratio of 30:8:1 of wood, perlite, and styrene foam beads based on the total final weight of the tile backer board was added into the amorphous phase cementitious material forming a flowable concrete.

0.1 weight percent of a re-dispersible powder polymer was added to the amorphous phase cementitious material based on the final total weight of the tile backer board. The re-dispersible powder polymer was a vinyl acetate ethylene.

The flowable, uncured concrete was then poured over a reinforcing component forming a reinforced concrete.

The reinforcing component was a woven hydrocarbon containing mat. The reinforcing component was 0.1 wt % based on the total final weight of the tile backer board.

For this Sample 7, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by 49% to 29 $m^2/g$.

The cured material of Sample 7 formed a tile backer board which as stable in water at 60 degrees Celsius for 24 hours using the Jet Products, LLC Warm Water Stability Test as authenticated by Clemson University Chemical Engineering Department in 2017.

Sample 8

Sample 8 contains 32 wt % of a magnesium oxide dry powder containing 85 wt % of magnesium oxide based on a final total weight of the cementitious material was used.

The magnesium oxide had a surface area ranging from 5 $meters^2/gram$ to 50 $meters^2/gram$ and an average particle size ranging from about 0.3 to about 90 microns wherein more than about 90% by weight magnesium oxide particles were less than or equal to about 40 microns.

The magnesium oxide was blended with 17 wt % of a magnesium chloride dissolved in water based on a final total weight of the cementitious material.

For Sample 7, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 5 wt % of a stabilizing material with a phosphorus-containing compound based on a final total weight of the cementitious material to the mixed liquid suspension.

For Sample 8, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

Sample 8 contains 12 wt % of aggregate component as a ratio of 30:8:1 of wood, perlite, and styrene foam beads based on the total final weight of the tile backer board was added into the amorphous phase cementitious material forming a flowable concrete.

5 weight percent of a re-dispersible powder polymer was added to the amorphous phase cementitious material based on the final total weight of the tile backer board. The re-dispersible powder polymer was a vinyl acetate ethylene.

The flowable, uncured concrete was then poured over a reinforcing component forming a reinforced concrete.

The reinforcing component was a non-woven silica containing mat. The reinforcing component was 0.1 wt % based on the total final weight of the tile backer board.

For this Sample 8, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by more than 44% to 28 $m^2/g$.

The cured material of Sample 8 formed a tile backer board which as stable in water at 60 degrees Celsius for 24 hours using the Jet Products, LLC Warm Water Stability Test as authenticated by Clemson University Chemical Engineering Department in 2017.

Sample 9

Sample 9 contains 35 wt % of a magnesium oxide dry powder containing 85 wt % of magnesium oxide based on a final total weight of the cementitious material was used.

The magnesium oxide had a surface area ranging from 5 $meters^2/gram$ to 50 $meters^2/gram$ and an average particle size ranging from about 0.3 to about 90 microns wherein more than about 90% by weight magnesium oxide particles were less than or equal to about 40 microns.

The magnesium oxide was blended with 16 wt % of a magnesium chloride dissolved in water based on a final total weight of the cementitious material.

For Sample 9, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 6.25 wt % of a stabilizing material with a phosphorus-containing compound based on a final total weight of the cementitious material to the mixed liquid suspension.

For Sample 9, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

Sample 9 contains 13 wt % of aggregate component as a ratio of 30:8:1 of wood, perlite, and styrene foam beads based on the total final weight of the tile backer board was added into the amorphous phase cementitious material forming a flowable concrete.

0.1 weight percent of an acrylic was added to the amorphous phase cementitious material based on the final total weight of the tile backer board.

The flowable, uncured concrete was then poured over a reinforcing component forming a reinforced concrete.

The reinforcing component was a woven silica containing mat. The reinforcing component was 0.1 wt % based on the total final weight of the tile backer board.

For this Sample 9, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by 23% to 24 $m^2/g$.

The cured material of Sample 9 formed a tile backer board which as stable in water at 60 degrees Celsius for 24 hours using the Jet Products, LLC Warm Water Stability Test as authenticated by Clemson University Chemical Engineering Department in 2017.

Sample 10

Sample 10 contains 30 wt % of a magnesium oxide dry powder containing 85 wt % of magnesium oxide based on a final total weight of the cementitious material was used.

The magnesium oxide had a surface area ranging from 5 $meters^2/gram$ to 50 $meters^2/gram$ and an average particle size ranging from about 0.3 to about 90 microns wherein more than about 90% by weight magnesium oxide particles were less than or equal to about 40 microns.

The magnesium oxide was blended with 18 wt % of a magnesium chloride dissolved in water based on a final total weight of the cementitious material.

For Sample 10, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 7.5 wt % of a stabilizing material with a phosphorus-containing compound based on a final total weight of the cementitious material to the mixed liquid suspension.

For Sample 10, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

Sample 10 contains 14 wt % of aggregate component as a ratio of 30:8:1 of wood, perlite, and styrene foam beads based on the total final weight of the tile backer board was added into the amorphous phase cementitious material forming a flowable concrete.

5 weight percent of an acrylic was added to the amorphous phase cementitious material based on the final total weight of the tile backer board.

The flowable, uncured concrete was then poured over a reinforcing component forming a reinforced concrete.

The reinforcing component was a woven hydrocarbon containing mat. The reinforcing component was 0.1 wt % based on the total final weight of the tile backer board.

For this Sample 10, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by more than 38% to 27 $m^2/g$.

The cured material of Sample 10 formed a tile backer board which as stable in water at 60 degrees Celsius for 24 hours using the Jet Products, LLC Warm Water Stability Test as authenticated by Clemson University Chemical Engineering Department in 2017.

Sample 11

Sample 11 contains 33 wt % of a magnesium oxide dry powder containing 85 wt % of magnesium oxide based on a final total weight of the cementitious material was used.

The magnesium oxide had a surface area ranging from 5 $meters^2/gram$ to 50 $meters^2/gram$ and an average particle size ranging from about 0.3 to about 90 microns wherein more than about 90% by weight magnesium oxide particles were less than or equal to about 40 microns.

The magnesium oxide was blended with 15 wt % of a magnesium chloride dissolved in water based on a final total weight of the cementitious material.

For Sample 11, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 8.75 wt % of a stabilizing material with a phosphorus-containing compound based on a final total weight of the cementitious material to the mixed liquid suspension.

For Sample 11, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

Sample 11 contains 16 wt % of aggregate component as a ratio of 30:8:1 of wood, perlite, and styrene foam beads based on the total final weight of the tile backer board was added into the amorphous phase cementitious material forming a flowable concrete.

0.1 weight percent of a styrene butadiene rubber was added to the amorphous phase cementitious material based on the final total weight of the tile backer board.

The flowable, uncured concrete was then poured over a reinforcing component forming a reinforced concrete.

The reinforcing component was a non-woven silica containing mat. The reinforcing component was 0.1 wt % based on the total final weight of the tile backer board.

For this Sample 11, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by more than 49% to 29 $m^2/g$.

The cured material of Sample 11 formed a tile backer board which as stable in water at 60 degrees Celsius for 24 hours using the Jet Products, LLC Warm Water Stability Test as authenticated by Clemson University Chemical Engineering Department in 2017.

Sample 12

Sample 12 contains 32 wt % of a magnesium oxide dry powder containing 85 wt % of magnesium oxide based on a final total weight of the cementitious material was used.

The magnesium oxide had a surface area ranging from 5 $meters^2/gram$ to 50 $meters^2/gram$ and an average particle size ranging from about 0.3 to about 90 microns wherein more than about 90% by weight magnesium oxide particles were less than or equal to about 40 microns.

The magnesium oxide was blended with 19 wt % of a magnesium chloride dissolved in water based on a final total weight of the cementitious material.

For Sample 12, the magnesium chloride in aqueous solution was a 28 wt % magnesium chloride aqueous solution.

After 3 minutes of mixing with a planetary mixer, the magnesium oxide and the magnesium chloride in water form a liquid suspension while minimizing adding gas into the liquid suspension.

For this sample, the next step involved adding 10 wt % of a stabilizing material with a phosphorus-containing compound based on a final total weight of the cementitious material to the mixed liquid suspension.

For Sample 12, the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 2 minutes.

Sample 12 contains 17 wt % of aggregate component as a ratio of 30:8:1 of wood, perlite, and styrene foam beads based on the total final weight of the tile backer board was added into the amorphous phase cementitious material forming a flowable concrete.

5 weight percent of a styrene butadiene rubber was added to the amorphous phase cementitious material based on the final total weight of the tile backer board.

The flowable, uncured concrete was then poured over a reinforcing component forming a reinforced concrete.

The reinforcing component was a woven silica containing mat. The reinforcing component was 0.1 wt % based on the total final weight of the tile backer board.

For this Sample 12, a portion of the amorphous phase cementitious material formed a plurality of crystals, each crystal is known as a "Magnesium Oxychloride Cement Crystals" having a MW of 530.7 with amorphous non-crystalline nano-molecular cementitious material encapsulating the plurality of crystals, creating a nano-molecular veneer without detectable phosphorus-containing compound while increasing surface area of the plurality of crystals by 49% to 29 $m^2/g$.

The cured material of Sample 12 formed a tile backer board which as stable in water at 60 degrees Celsius for 24 hours using the Jet Products, LLC Warm Water Stability Test as authenticated by Clemson University Chemical Engineering Department in 2017.

Sample 13

Sample 13 has 29 wt % of a magnesium oxide dry powder containing 85 wt % of magnesium oxide based on a final total weight of the cementitious material.

The magnesium oxide had a surface area ranging from 5 $meters^2/gram$ to 50 $meters^2/gram$ and an average particle size ranging from about 0.3 to about 90 microns wherein more than about 90% by weight magnesium oxide particles were less than or equal to about 40 microns.

The magnesium oxide was blended with 14 wt % of a magnesium chloride dissolved in water based on a final total weight of the cementitious material.

For Sample 13 the magnesium chloride in aqueous solution was a 28 wt % magnesium chloride aqueous solution.

After 3 minutes of mixing with a planetary mixer, the magnesium oxide and the magnesium chloride in water formed a liquid suspension while minimizing adding gas into the liquid suspension.

For this sample, the next step involved adding 0.1 wt % of a stabilizing material with a phosphorus-containing compound based on a final total weight of the cementitious material to the mixed liquid suspension.

For Sample 13 the stabilizing material with the phosphorus-containing compound was a phosphorous acid (A) based on the final total weight of the cementitious material, wherein the phosphorous acid consists of an aqueous solution of 60 wt % of a concentrate of $H_3PO_3$.

The liquid suspension with stabilizing material was permitted to react into an amorphous phase cementitious material for a period of time of 3 minutes.

Next, to form the tile backer board of this Sample 13, 0.1 wt % of aggregate component known as wood fibers based on the total final weight of the tile backer board was added into the amorphous phase cementitious material forming a flowable concrete.

The flowable, uncured concrete was then mixed with a reinforcing component forming a reinforced concrete.

The reinforcing component was 0.1 wt percent chopped silica containing fibers.

In this sample, a portion of the amorphous phase cementitious material forms a plurality of crystals, each crystal is known as a "Magnesium Oxychloride Cement Crystal" having a MW of 530.7 with amorphous non-crystalline nano-molecular cementitious material encapsulating the plurality of crystals, forming a nano-molecular veneer without detectable phosphorus-containing compound while increasing surface area of the plurality of crystals by 2% to 20 $m^2/g$.

The cured material formed a tile backer board which as stable in water at 60 degrees Celsius for 24 hours using the Jet Products, LLC Warm Water Stability Test as authenticated by Clemson University Chemical Engineering Department in 2017.

Sample 14

Sample 14 has 40 wt % of a magnesium oxide dry powder containing 85 wt % of magnesium oxide based on the formed cementitious material.

The magnesium oxide had a surface area ranging from 5 $meters^2/gram$ to 50 $meters^2/gram$ and an average particle size ranging from about 0.3 to about 90 microns wherein more than about 90% by weight magnesium oxide particles were less than or equal to about 40 microns.

The magnesium oxide was blended with 18 wt % of a magnesium chloride dissolved in water based on a final total weight of the cementitious material.

For Sample 14 the magnesium chloride in aqueous solution was a 28 wt % magnesium chloride aqueous solution.

After 3 minutes of mixing with a planetary mixer, the magnesium oxide and the magnesium chloride in water formed a liquid suspension while minimizing adding gas into the liquid suspension.

For this sample, the next step involved adding 0 wt % of a stabilizing material with a phosphorus-containing compound based on a final total weight of the cementitious material to the mixed liquid suspension.

For Sample 14 the stabilizing material with the phosphorus-containing compound was a phosphoric acid based on the final total weight of the cementitious material, wherein the phosphoric acid consists of an aqueous solution of 80 wt % to 90 wt % of a concentrate of $H_3PO_4$.

The liquid suspension with stabilizing material was permitted to react into an amorphous phase cementitious material for a period of time of 3 minutes.

Next, to form the tile backer board of this Sample 14, 30 wt % of aggregate component known as wood fibers based on the total final weight of the tile backer board was added into the amorphous phase cementitious material forming a flowable concrete.

The flowable, uncured concrete was then mixed with a reinforcing component forming a reinforced concrete.

The reinforcing component was 15 wt percent nano-molecular carbon fiber strands.

In this sample, a portion of the amorphous phase cementitious material forms a plurality of crystals, each crystal is known as a "Magnesium Oxychloride Cement Crystal" having a MW of 530.7 with amorphous non-crystalline nano-molecular cementitious material encapsulating the plurality of crystals, forming a nano-molecular veneer without detectable phosphorus-containing compound while increasing surface area of the plurality of crystals by 49% to 29 $m^2/g$.

The cured material formed a tile backer board which as stable in water at 60 degrees Celsius for 24 hours using the Jet Products, LLC Warm Water Stability Test as authenticated by Clemson University Chemical Engineering Department in 2017.

FIGS. 3P-3T also show samples 15 to 24 present additional formulations and physical properties of created tile backer board samples using chopped fibers as the reinforcing component and different additives, including biomass, surfactant, re-dispersible polymer power, acrylic and styrene butadiene rubber which were created in the manner identical to Samples 1 to 14.

FIG. 4 shows a first example of a magnesium oxychloride cement board using U.S. raw materials and 0% phosphoric acid.

FIG. 4 shows a second example of a magnesium oxychloride cement board using U.S. raw materials and 1.25% phosphoric acid.

FIG. 4 shows a third example of a magnesium oxychloride cement board using U.S. raw materials and 2.5% phosphoric acid.

FIG. 4 shows a fourth example of a magnesium oxychloride cement board using Chinese raw materials and 0% phosphoric acid.

FIG. 4 shows a fifth example of a magnesium oxychloride cement board using Chinese raw materials and 1.5% phosphoric acid.

FIG. 4 shows a sixth example of a magnesium oxychloride cement board using Chinese raw materials and 3% phosphoric acid.

The invention claimed is:

1. A cementitious construction material, the construction material comprising magnesium oxychloride crystals at least partially surrounded by a phosphorus-containing amorphous layer, wherein the magnesium oxychloride crystals constitute from 61 wt % to 74 wt % of the cementitious construction material, as determined by X-Ray Diffraction.

2. The cementitious construction material of claim 1, wherein the phosphorus-containing amorphous layer is substantially free of crystalline silica.

3. The cementitious construction material of claim 2, wherein the phosphorus-containing amorphous layer is in the form of a nano-molecular veneer comprising non-crystalline, phosphorus-containing species identifiable by elemental analysis utilizing a scanning electron microscope (SEM).

4. The cementitious construction material of claim 3, wherein at least a portion of the nano-molecular veneer is insoluble in water.

5. The cementitious construction material of claim 1, wherein the phosphorus-containing amorphous layer constitutes from 10 wt % to about 50 wt % of the cementitious construction material, as determined by X-Ray Diffraction.

6. The cementitious construction material of claim 1, wherein the magnesium oxychloride crystal content, after a 24-hour soak in water having a temperature of 60° C., is from about 2 wt % to about 50 wt %, as determined by X-Ray Diffraction.

7. The cementitious construction material of claim 1 having a BET surface area of from about 20 $m^2/g$ to about 30 $m^2/g$.

8. The cementitious construction material of claim 1, wherein the construction material is substantially free of magnesium phosphate.

9. The cementitious construction material of claim 1, the construction material further comprising from 0.1 wt % to 30 wt % of aggregate based on the total weight of the material.

10. The cementitious construction material of claim 9, wherein the aggregate is selected from the group consisting of wood, perlite, styrene based foam beads, calcium carbonate powder, glass particulate, and combinations thereof.

11. The cementitious construction material of claim 1, the construction material further comprising from 0.1 wt % to 2 wt % of a reinforcing material based on the total weight of the material.

12. The cementitious construction material of claim 11, wherein the reinforcing material is selected from the group consisting of non-woven silica containing mat, woven silica-containing mat, non-woven hydrocarbon containing wat, woven hydrocarbon containing mat, and combinations thereof.

13. The cementitious construction material of claim 1, the construction material further comprising from 0.1 wt. % to 15 wt. % of biomass based on the total weight of the material.

14. The cementitious construction material of claim 13, wherein the biomass is selected from the group consisting of rice husks, corn husks, dung, and combinations thereof.

15. The cementitious construction material of claim 1, the construction material further comprising from 0.1 wt % to 10 wt % of at least one surfactant based on the total weight of the material.

16. The cementitious construction material of claim 1, the construction material further comprising from 0.1 wt % to 5 wt. % of a re-dispersible powder polymer based on the final total weight of the material.

17. The cementitious construction material of claim 16, wherein the re-dispersible powder polymer is selected from the group consisting of polyurethane dispersion, polyurethane, alkyl carboxylic acid vinyl ester monomer, branched and unbranched alcohol(meth)acrylic acid ester monomer, vinyl aromatic monomer, olefin monomer, diene monomer, vinyl halide monomer, vinyl acetate ethylene (VAE), and combinations thereof.

18. The cementitious construction material of claim 1, the construction material further comprising from 0.1 wt % to 5 wt % of an acrylic or styrene butadiene rubber (SBR) based on the total final weight of the material.

19. The cementitious construction material of claim 1, the construction material further comprising from 0.1 wt % to 15 wt % based on the total weight of the material of a reinforcing material.

20. The cementitious construction material of claim 19, wherein the reinforcing material is selected from the group consisting of chopped silica containing fibers, hemp containing fibers, nano-molecular carbon fiber strands, chopped carbon fibers, chopped hydrocarbon fibers, and combinations thereof.

* * * * *